United States Patent
Kuo

(10) Patent No.: US 11,903,059 B2
(45) Date of Patent: Feb. 13, 2024

(54) METHOD AND APPARATUS FOR QUALITY OF SERVICE (QOS) FLOW ESTABLISHMENT IN A WIRELESS COMMUNICATION SYSTEM

(71) Applicant: ASUS Technology Licensing Inc., Taipei (TW)

(72) Inventor: Richard Lee-Chee Kuo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/098,351

(22) Filed: Jan. 18, 2023

(65) Prior Publication Data

US 2024/0015818 A1    Jan. 11, 2024

Related U.S. Application Data

(60) Provisional application No. 63/388,011, filed on Jul. 11, 2022.

(51) Int. Cl.
*H04W 88/04* (2009.01)
*H04W 76/14* (2018.01)

(52) U.S. Cl.
CPC ............ *H04W 76/14* (2018.02); *H04W 88/04* (2013.01)

(58) Field of Classification Search
CPC .............................. H04W 76/14; H04W 88/04
See application file for complete search history.

(56) References Cited

U.S. PATENT DOCUMENTS

| | | | |
|---|---|---|---|
| 11,689,957 B2 * | 6/2023 | Paladugu | H04W 28/0268 370/229 |
| 2018/0249524 A1 * | 8/2018 | Yi | H04W 76/18 |
| 2019/0260545 A1 * | 8/2019 | Wang | H04L 5/0094 |
| 2021/0289391 A1 * | 9/2021 | Paladugu | H04L 47/2491 |
| 2021/0400759 A1 * | 12/2021 | Kuo | H04W 76/25 |
| 2022/0086682 A1 * | 3/2022 | Watfa | H04W 28/0268 |
| 2022/0124549 A1 * | 4/2022 | Yang | H04W 28/0268 |
| 2022/0279389 A1 * | 9/2022 | Xing | H04W 28/0268 |
| 2022/0322135 A1 | 10/2022 | Xu et al. | |
| 2023/0063139 A1 * | 3/2023 | Du | H04W 40/22 |
| 2023/0073469 A1 * | 3/2023 | Wang | H04W 72/1263 |

\* cited by examiner

*Primary Examiner* — Joseph E Dean, Jr.
(74) *Attorney, Agent, or Firm* — Blue Capital Law Firm, P.C.

(57) ABSTRACT

A method and device for Quality of Service (QOS) flow establishment are disclosed. A relay User Equipment (UE) establishes a PC5 unicast link with a remote UE. The relay UE also receives an identity of a PC5 QoS flow and a first PC5 5G QoS Identifier (PQI) of the PC5 QoS flow from the remote UE for adding the PC5 QoS flow, wherein the first PQI indicates end-to-end QoS requirements of the PC5 QoS flow for traffic transmission between the remote UE and a network. The relay UE further derives a second PQI for the PC5 QoS flow and a 5QI for a QoS flow according to the first PQI. In addition, the relay UE transmits a Protocol Data Unit (PDU) Session Modification Request message to the network for adding the QoS flow, wherein the PDU Session Modification Request message includes an identity of the QoS flow and the 5QI.

20 Claims, 21 Drawing Sheets

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 24 | GBR (NOTE 1) | 1 | 150 ms | $10^{-2}$ | N/A | 2000 ms | Mission Critical user plane Push To Talk voice (e.g. MCPTT) |
| 25 | | 2 | 200 ms | $10^{-2}$ | N/A | 2000 ms | Non-Mission-Critical user plane Push To Talk voice |
| 26 | | 2 | 200 ms | $10^{-3}$ | N/A | 2000 ms | Mission Critical Video user plane |
| 60 | Non-GBR | 1 | 120 ms | $10^{-6}$ | N/A | N/A | Mission Critical delay sensitive signalling (e.g. MC-PTT signalling) |
| 61 | | 6 | 400 ms | $10^{-6}$ | N/A | N/A | Mission Critical Data (e.g. example services are the same as 5QI 6/8/9 as specified in TS 23.501 [4]) |
| 92 | Delay Critical GBR (NOTE 1) | 5 | 5ms | $10^{-4}$ | 20000 bytes | 2000 ms | Interactive service - consume VR content with high compression rate via tethered VR headset (See TS 22.261 [6]) |
| 93 | | 6 | 10ms | $10^{-4}$ | 20000 bytes | 2000 ms | Interactive service - consume VR content with low compression rate via tethered VR headset; Gaming or Interactive Data Exchanging (See TS 22.261 [6]) |
| NOTE 1: GBR and Delay Critical GBR PQIs can only be used for unicast PC5 communications. | | | | | | | |

FIG. 7 (PRIOR ART)

METHOD AND APPARATUS FOR QUALITY OF SERVICE (QOS) FLOW ESTABLISHMENT IN A WIRELESS COMMUNICATION SYSTEM

CROSS-REFERENCE TO RELATED APPLICATIONS

The present Application claims the benefit of U.S. Provisional Patent Application Ser. No. 63/388,011 filed on Jul. 11, 2022, the entire disclosure of which is incorporated herein in its entirety by reference.

FIELD

This disclosure generally relates to wireless communication networks, and more particularly, to a method and apparatus for QOS flow establishment in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for Quality of Service (QOS) flow establishment are disclosed from the perspective of a relay User Equipment (UE). In one embodiment, a relay User Equipment (UE) establishes a PC5 unicast link with a remote UE. The relay UE also receives an identity of a PC5 QoS flow and a first PC5 5G QoS Identifier (PQI) of the PC5 QoS flow from the remote UE for adding the PC5 QoS flow, wherein the first PQI indicates end-to-end QoS requirements of the PC5 QoS flow for traffic transmission between the remote UE and a network. The relay UE further derives a second PQI for the PC5 QoS flow and a 5QI for a QoS flow according to the first PQI. In addition, the relay UE transmits a Protocol Data Unit (PDU) Session Modification Request message to the network for adding the QoS flow, wherein the PDU Session Modification Request message includes an identity of the QoS flow and the 5QI. Furthermore, the relay UE receives a PDU Session Modification Command message from the network, wherein the PDU Session Modification Command message includes the identity of the QoS flow and an authorized 5QI for the QoS flow. The relay UE also derives a third PQI for the PC5 QoS flow according to the authorized 5QI if the authorized 5QI is different from the 5QL. In addition, the relay UE transmits the identity of the PC5 QoS flow and the second PQI to the remote UE if the authorized 5QI is same as the 5QI and the relay UE transmits the identity of the PC5 QoS flow and the third PQI to the remote UE if the authorized 5QI is different from the 5QI.

BRIEF DESCRIPTION OF THE DRAWINGS

FIG. 7 is a reproduction of Table 5.6.1-1 of 3GPP TS 23.304 V17.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V17.0.0, "Proximity based Services (ProSe) in the 5G System (5GS) (Release 17)"; TS 38.331 V17.0.0 (2022-03), "NR; Radio Resource Control (RRC) protocol specification (Release 17)"; and Draft TS 38.331 V17.1.0 (2022-06) ("Draft_38331-h10_v2.docx"), "NR; Radio Resource Control (RRC) protocol specification (Release 17)". The standards and documents listed above are hereby expressly incorporated by reference in their entirety.

Figure 1:
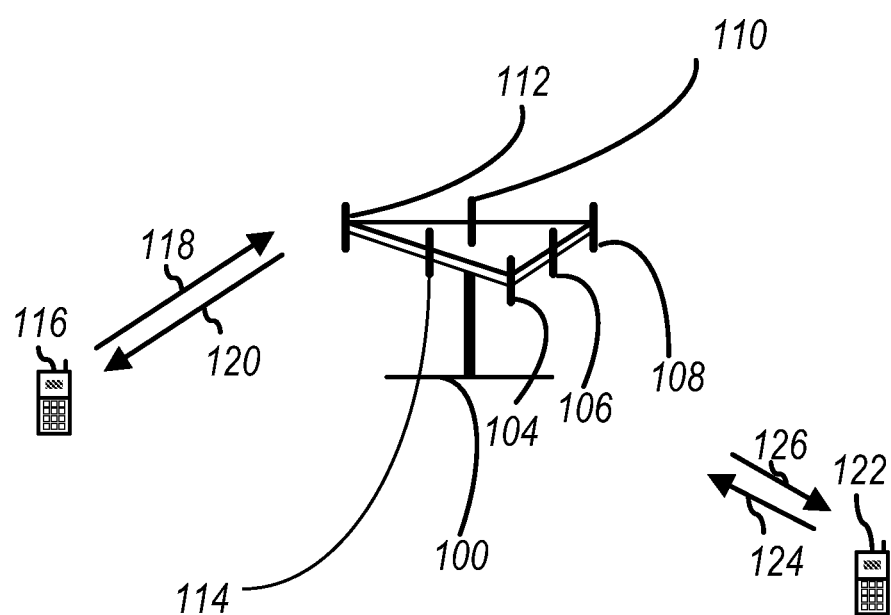
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
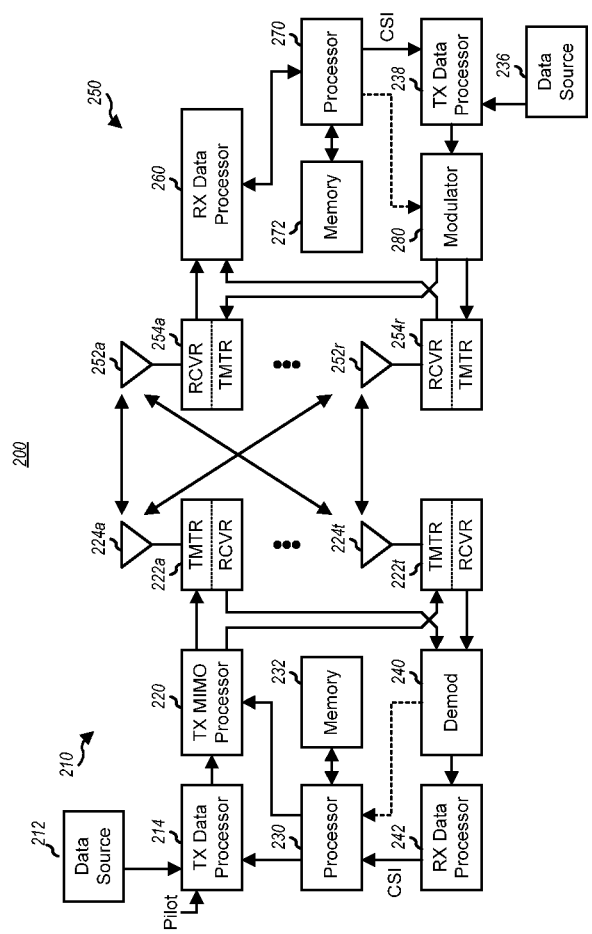
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
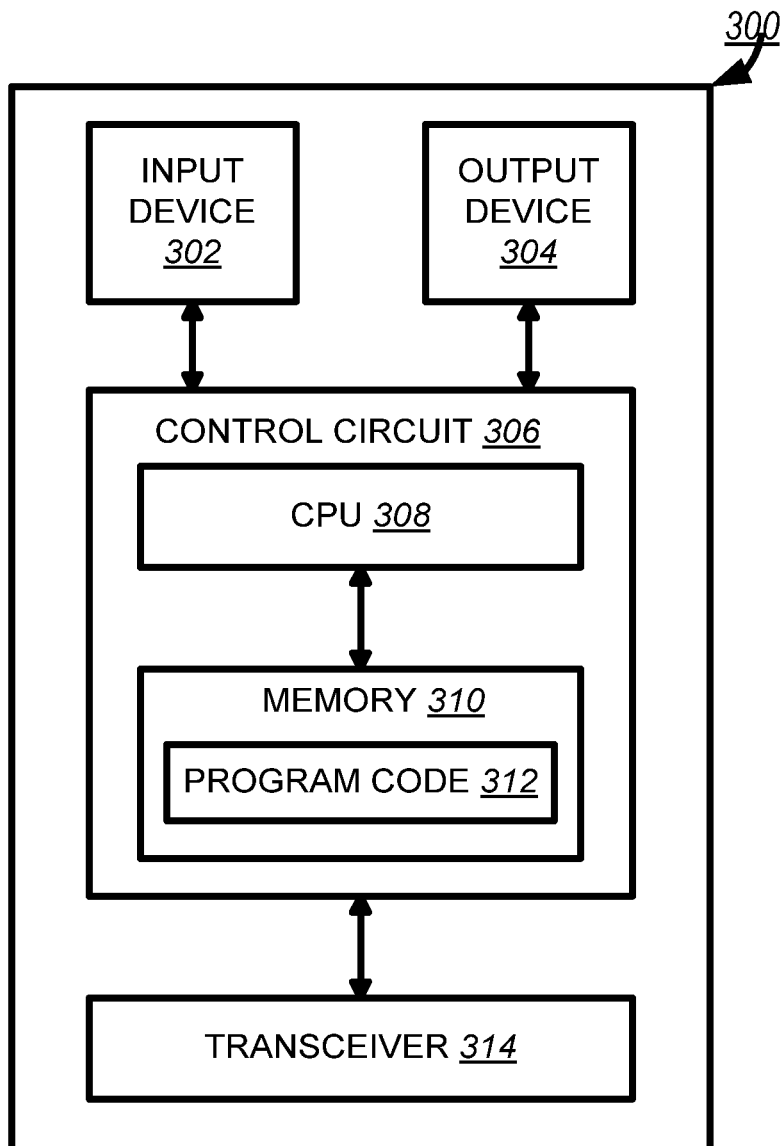
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
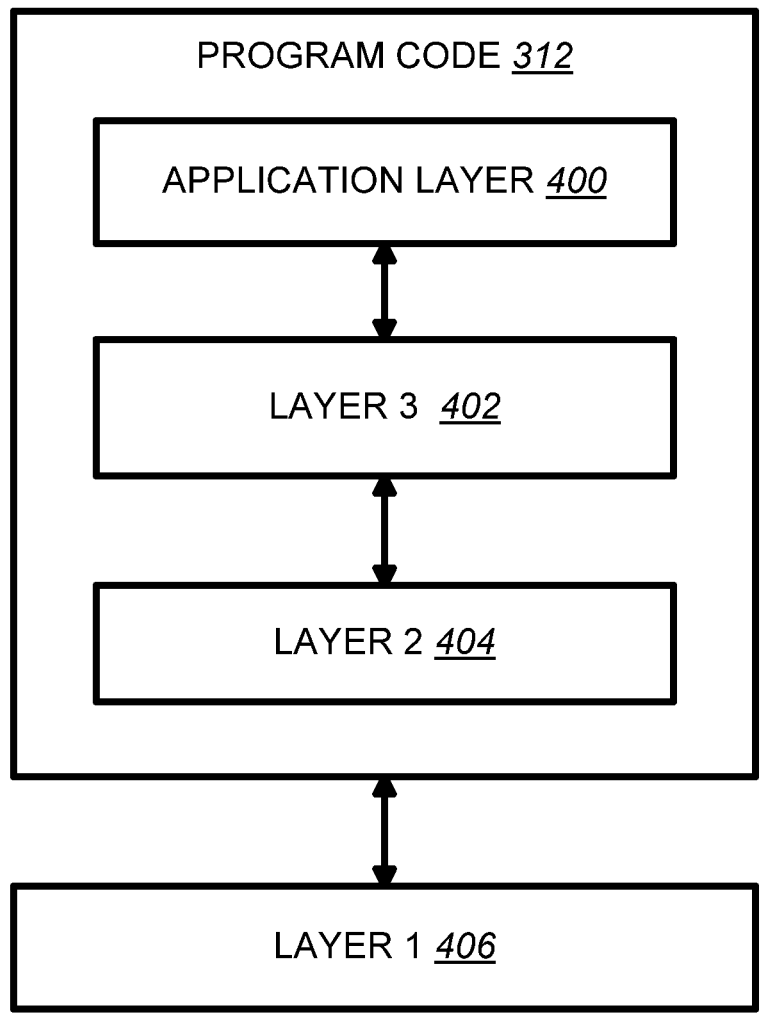
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 specifies UE-to-Network Relay operations as follows:

4.2.7 5G ProSe UE-to-Network Relay Reference Architecture 4.2.7.1 5G ProSe Layer-3 UE-to-Network Relay Reference Architecture The following FIG. 4.2.7.1-1 shows the high level reference architecture for 5G ProSe Layer-3 UE-to-Network Relay. In this figure, the 5G ProSe Layer-3 UE-to-Network Relay may be in the HPLMN or a VPLMN.

Figure 5:
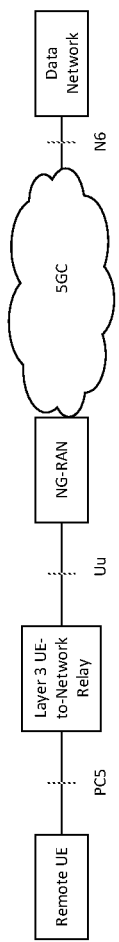
FIG. 5 is a reproduction of FIG. 4.2.7.1-1 of 3GPP TS 23.304 V17.3.0.

[FIG. 4.2.7.1-1 of 3GPP TS 23.304 V17.3.0, entitled "Reference architecture for 5G ProSe Layer-3 UE-to-Network Relay", is reproduced as FIG. 5]

4.2.7.2 5G ProSe Layer-2 UE-to-Network Relay Reference Architecture

FIG. 4.2.7.2-1 shows the 5G ProSe Layer-2 UE-to-Network Relay reference architecture. The 5G ProSe Layer-2 Remote UE and 5G ProSc Layer-2 UE-to-Network Relay may be served by the same or different PLMNs. If the serving PLMNs of the 5G ProSe Layer-2 Remote UE and the 5G ProSe Layer-2UE-to-Network Relay are different then NG-RAN is shared by the serving PLMNs, see the 5G MOCN architecture in clause 5.18 of TS 23.501 [4].

Figure 6:
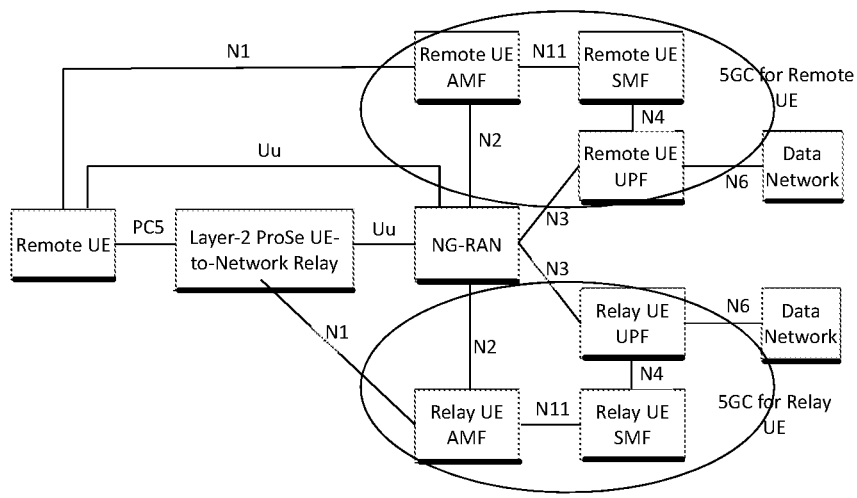
FIG. 6 is a reproduction of FIG. 4.2.7.2-1 of 3GPP TS 23.304 V17.3.0.

[FIG. 4.2.7.2-1 of 3GPP TS 23.304 V17.3.0, entitled "5G ProSe Layer-2 UE-to-Network Relay reference architecture", is reproduced as FIG. 6]

NOTE 1: Uu between the 5G ProSe Layer-2 Remote UE and NG-RAN consists of RRC, SDAP and PDCP.

NOTE 2: The 5G ProSe Layer-2 Remote UE and 5G ProSe Layer-2 UE-to-Network Relay are served by the same NG-RAN. The Core Network entities (e.g., AMF, SMF, UPF) serving the 5G ProSe Layer-2 Remote UE and the 5G ProSe Layer-2 UE-to-Network Relay can be the same or different.

4.3.9 5G ProSe UE-to-Network Relay 4.3.9.1 General

Both 5G ProSe Layer-2 and Layer-3 UE-to-Network Relay entity provides the relaying functionality to support connectivity to the network for 5G ProSe Remote UEs. It can be used for both public safety services and commercial services (e.g. interactive service).

Both 5G ProSe Layer-2 and Layer-3 UE-to-Network Relay supports the following functions to enable connectivity to the network:

5G ProSe UE-to-Network Relay Discovery service as defined in clause 6.3.2.3, to allow discovery by the 5G ProSe Remote UE;

access the 5GS as a UE as defined in TS 23.501 [4] with the enhancements as specified in clauses 6.2 and 6.6;

relays unicast traffic (uplink and downlink) between the 5G ProSe Remote UE and the network, supporting IP, Ethernet or Unstructured traffic type.

NOTE: Relaying MBS traffic to a 5G ProSe Remote UE by a 5G ProSe UE-to-Network Relay is not supported in this release of the specification.

4.3.9.2 5G ProSe Layer-3 UE-to-Network Relay

In addition to the common 5G ProSe UE-to-Network Relay functions defined in clause 4.3.9.1, 5G ProSe Layer-3 UE-to-Network Relay supports the following functions to enable connectivity to the network:

5G ProSe Direct Communication via 5G ProSe Layer-3 UE-to-Network Relay as specified in clause 6.5.1, for the communication with the 5G ProSe Layer-3 Remote UEs for the relay operations;

end-to-end QoS treatment for the 5G ProSe Layer-3 Remote UE's traffic without N3IWF as defined in clause 5.6.2.1 and when accessing via an N3IWF as defined in clause 5.6.2.2;

IP address management for the 5G ProSe Layer-3 Remote UE as defined in clause 5.5.1.3 in case the 5G ProSe Layer-3 Remote UE uses IP traffic type.

4.3.9.3 5G ProSe Layer-2 UE-to-Network Relay

In addition to the common 5G ProSe UE-to-Network Relay functions defined in clause 4.3.9.1, 5G ProSe Layer-2 UE-to-Network Relay supports the following functions to enable connectivity to the network:

5G ProSe Direct Communication via 5G ProSe Layer-2 UE-to-Network Relay as specified in clause 6.5.2, for the communication with the 5G ProSe Layer-2 Remote UEs for the relay operations;

QoS handling for 5G ProSe Layer-2 UE-to-Network Relay and end-to-end QoS treatment as defined in clause 5.6.2.3.

5.4.1.2 5G ProSe Layer-3 UE-to-Network Relay with N3IWF Support

To support 5G ProSe Layer-3 Remote UE services with end-to-end confidentiality and IP address preservation requirements, the 5G ProSe Layer-3 UE-to-Network Relay with N3IWF shall provide access to the 5GC for the 5G ProSe Layer-3 Remote UE via N3IWF using the features defined in clause 4.2.8 of TS 23.501 [4].

5G ProSe Layer-3 UE-to-Network Relay is provisioned with RSC(s) and the corresponding PDU session parameters (e.g. S-NSSAI) to support N3IWF access as part of 5G ProSe Layer-3 UE-to-Network Relay Policy/parameters. When a 5G ProSe Layer-3 Remote UE connects with the corresponding RSC, the 5G ProSe Layer-3 UE-to-Network Relay determines the corresponding PDU session parameters based on the requested RSC.

NOTE: The 5G ProSe Layer-3 UE-to-Network Relay only includes a RSC in discovery message when the corresponding PDU session parameters (e.g. S-NSSAI) are authorized to be used in the accessed network.

The 5G ProSe Layer-3 Remote UE selects N3IWF as specified in clause 6.5.1.2.2. The selection of N3IWF follows the regulatory rules of the country where it is located, and when required by the regulations the 5G ProSe Layer-3 Remote UE only selects a N3IWF within the local country. QoS differentiation can be provided on per-IPsec Child Security Association basis and the details are provided in clause 5.6.2.2.

The 5GC to which the 5G ProSe Layer-3 UE-to-Network Relay registers and the 5GC to which the 5G ProSe Layer-3 Remote UE registers may be in the same PLMN or different PLMN.

5.6 QoS Handling 5.6.1 QoS Handling for 5G ProSe Direct Communication

In order to support QoS handling for 5G ProSe Direct Communication, the mechanism defined in clause 5.4 of TS 23.287 [2] is reused with the following differences:

Only NR PC5 QoS model is used.

PC5 Packet Filter Set supports three types of packet filters, i.e. the Prose IP Packet Filter Set, ProSe Ethernet Packet Filter Set, and the Prose Packet Filter Set. Each PC5 QoS Rule additionally contains the ProSe identifier when the ProSe identifier is not included in the PC5 Packet Filter Set.

V2X IP Packet Filter Set is replaced by ProSe IP Packet Filter Set.

V2X Packet Filter Set is replaced by ProSe Packet Filter Set. ProSe Packet Filter Set shall support Packet Filters based on at least any combination of:

ProSe identifier;

Source/Destination Layer-2 ID;

Application Layer ID.

ProSe Ethernet Packet Filter Set that has the same format as the Ethernet Packet Filter Set defined in clause 5.7.6.3 of TS 23.501 [4] is additionally defined.

V2X application layer is replaced by ProSe application layer.

V2X layer is replaced by ProSe layer.

V2X service type is replaced by ProSe identifier.

UE-PC5-AMBR is only applied for NR PC5.

The PQI values are additionally defined. The one-to-one mapping of standardized PQI values that are additionally defined to PC5 QoS characteristics is specified in table 5.6.1-1.

[Table 5.6.1-1 of 3GPP TS 23.304 V17.3.0, entitled "Standardized PQI values that are additionally defined to QoS characteristics mapping", is reproduced as FIG. 7]

5.6.2 QoS Handling for 5G ProSe UE-to-Network Relay Operations 5.6.2.1 QoS Handling for 5G ProSe Layer-3 UE-to-Network Relay without N3IWF For a 5G ProSe Layer-3 Remote UE accessing network via 5G ProSe Layer-3 UE-to-Network Relay without N3IWF, the QoS requirement of the relay traffic between 5G ProSe Layer-3 Remote UE and UPF can be satisfied by the corresponding QoS control for the PC5 link between 5G ProSe Layer-3 Remote UE and 5G ProSe Layer-3 UE-to-Network Relay (PC5 QoS control) and the QoS control for the PDU session established between 5G ProSe Layer-3 UE-to-Network Relay and UPF (i.e. Uu QoS control). The PC5 QoS is controlled with PC5 QoS rules and PC5 QoS parameters (e.g. PQI, GFBR, MFBR, PC5 LINK-AMBR) as specified in clause 5.4 of TS 23.287 [2]. The QoS for the PDU session established between the 5G ProSe Layer-3 UE-to-Network Relay and UPF (i.e. Uu QoS control) is controlled with QoS rules and 5G QoS parameters (e.g. 5QI, GFBR, MFBR) as specified in clause 5.7 of TS 23.501 [4].

As shown in FIG. 5.6.2.1-1 below, the end-to-end QoS can be met only when the QoS requirements are properly translated and satisfied over the two legs respectively.

Figure 8:
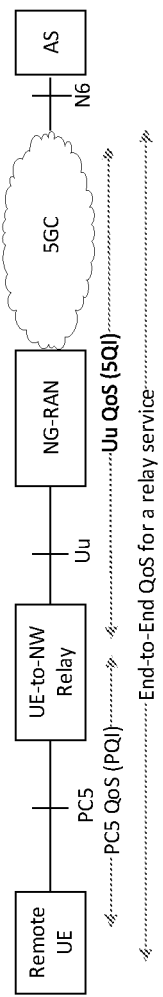
FIG. 8 is a reproduction of FIG. 5.6.2.1-1 of 3GPP TS 23.304 V17.3.0.

[FIG. 5.6.2.1-1 of 3GPP TS 23.304 V17.3.0, Entitled "End-to-End QoS Translation for 5G ProSe Layer-3 UE-to-Network Relay Operation", is Reproduced as FIG. 8]

To achieve this, the QoS mapping can be pre-configured or provided to the 5G ProSe Layer-3 UE-to-Network Relay by the PCF using Prose Policy as specified in clause 5.1.4.1. The QoS mapping includes combinations of the 5QIs and PQIs mapping as entries. The PQI shall have standardized values as defined in Table 5.6.1-1 and in Table 5.4.4-1 of TS 23.287 [2]. The 5QI shall have standardized values as defined in TS 23.501 [4] clause 5.7.4. The QoS mapping also includes an adjustment factor for the PQI's PDB, e.g. ⅓ of the standardized PDB value in Table 5.6.1-1 and Table 5.4.4-1 of TS 23.287 [2].

If the QoS Flows setup are initiated by network, the SMF can base on the PCC rules or its local configuration to generates the QoS rules and QoS Flow level QoS parameters (e.g. 5QI, GFBR, MFBR) and signal to the 5G ProSe Layer-3 UE-to-Network Relay using PDU Session Establishment/Modification procedure. For the PDU sessions used for relaying, the SMF always provides the QoS Flow level QoS parameters to the 5G ProSe Layer-3 UE-to-Network Relay when establishes a QoS Flow. Then the 5G ProSe Layer-3 UE-to-Network Relay decides the PC5 QoS parameters for the corresponding PC5 QoS Flow by determining the PQI based the QoS mapping, and the GFBR and MFBR values for the PC5 GBR QoS Flow are set equal to the GFBR and MFBR values for the GBR QoS Flow respectively. The PCF differentiates the relay traffic based on either local configuration, e.g. by a dedicated DNN or S-NSSAI used for relay traffic or by the traffic filters.

NOTE: Separate QoS mappings can be configured for different RSCs.

If the 5G ProSe Layer-3 Remote UE initiates PC5 QoS Flows setup or modification during the Layer-2 link establishment or modification procedure, the 5G ProSe Layer-3 Remote UE provides the QoS Info as described in clause 6.4.3.6 to the 5G ProSe Layer-3 UE-to-Network Relay. The received PC5 QoS parameters of the QoS Info (i.e. PQI and conditionally other parameters such as MFBR/GFBR, etc.) are interpreted as the end-to-end QoS requirements by the 5G ProSe Layer-3 UE-to-Network Relay for the traffic transmission between 5G ProSe Layer-3 Remote UE and UPF. If the end-to-end QoS requirements can be supported by an entry in QoS mapping, the 5G ProSe Layer-3 UE-to-Network Relay uses the 5QI of the entry for the Uu QoS control, and uses the PQI of the entry for the PC5 QoS control. If the end-to-end QoS requirements cannot be supported by any entries in QoS mapping, the 5G ProSe Layer-3 UE-to-Network Relay, based on its implementation, decides the 5QI for the Uu QoS control and PQI for the PC5 QoS control. The 5G ProSe Layer-3 UE-to-Network Relay provides the QoS Info (including PQI value chosen by the 5G ProSe Layer-3 UE-to-Network Relay) as part of the Accept message to the 5G ProSe Layer-3 Remote UE. If the 5G ProSe Layer-3 Remote UE performs the Layer-2 link modification procedure to add new PC5 QoS Flow(s) or modify the existing PC5 QoS Flow(s) for IP traffic or Ethernet traffic over PC5 reference point, the 5G ProSe Layer-3 Remote UE may also provide the PC5 QoS Rule(s) for the PC5 QoS Flow(s) to be added or modified to the 5G ProSe Layer-3 UE-to-Network Relay. The 5G ProSe Layer-3 UE-to-Network Relay may generate the Packet Filters used over Uu reference point based on the received PC5 QoS Rule(s).

The 5G ProSe Layer-3 UE-to-Network Relay performs the UE requested PDU session Modification as defined in TS 23.502 [5], clause 4.3.3 for authorizing the requested QoS including the 5QI and the Packet Filters. If the PCF authorizes the requested QoS with a different 5QI value, the 5G ProSe Layer-3 UE-to-Network Relay may further update the PQI value based on the authorized 5QI value, and the 5G ProSe Layer-3 UE-to-Network Relay performs the Layer-2 link modification procedure as defined in clause 6.4.3.6 to update the corresponding PC5 QoS Flow with the updated PQI value.

Alternatively, reflective QoS control over Uu as defined in TS 23.501 [4], clause 5.6.5.3 can be leveraged for dynamic QoS handling of 5G ProSe Layer-3 Remote UE to save on signalling between SMF and 5G ProSe Layer-3 UE-to-Network Relay. Upon reception of a DL packet with RQI on the Uu for the 5G ProSe Layer-3 Remote UE, based on the indicated QFI, the 5G ProSe Layer-3 UE-to-Network Relay creates a new derived QoS rule or updates existing derived QoS rule corresponding to the remote UE, as defined in TS 23.501 [4]. The derived QoS rule is for UL packets from the 5G ProSe Layer-3 Remote UE at Uu interface.

Based on signalled QoS rules (via SMF) or derived QoS rules (Uplink Uu via reflective QoS), the 5G ProSe Layer-3 UE-to-Network Relay may generate the Packet Filters used over PC5 reference point and use the L2 Link Modification procedures as defined in clause 6.4.3.6 to either update existing PC5 QoS Flow(s) or to set up new PC5 QoS Flow(s) (when the QFI to PC5 QoS Flow mapping does not exist). The 5G ProSe Layer-3 UE-to-Network Relay may also provide the PC5 QoS Rule(s) for the PC5 QoS Flow(s) to be added or modified to the 5G ProSe Layer-3 Remote UE.

When the 5G ProSe Layer-3 UE-to-Network relay deletes the derived QoS rule e.g. after the RQ Timer expires, the 5G ProSe Layer-3 UE-to-Network Relay may perform L2 Link Modification procedures defined in clause 6.4.3.6 accordingly using the PQI mapped from the 5QI of the currently used QoS rule after the deletion of the derived QoS rule(s).

6.4.3.1 Layer-2 Link Establishment Over PC5 Reference Point

To perform unicast mode of ProSe Direct communication over PC5 reference point, the UE is configured with the related information as described in clause 5.1.3.

FIG. 6.4.3.1-1 shows the layer-2 link establishment procedure for the unicast mode of ProSe Direct communication over PC5 reference point.

Figure 9:
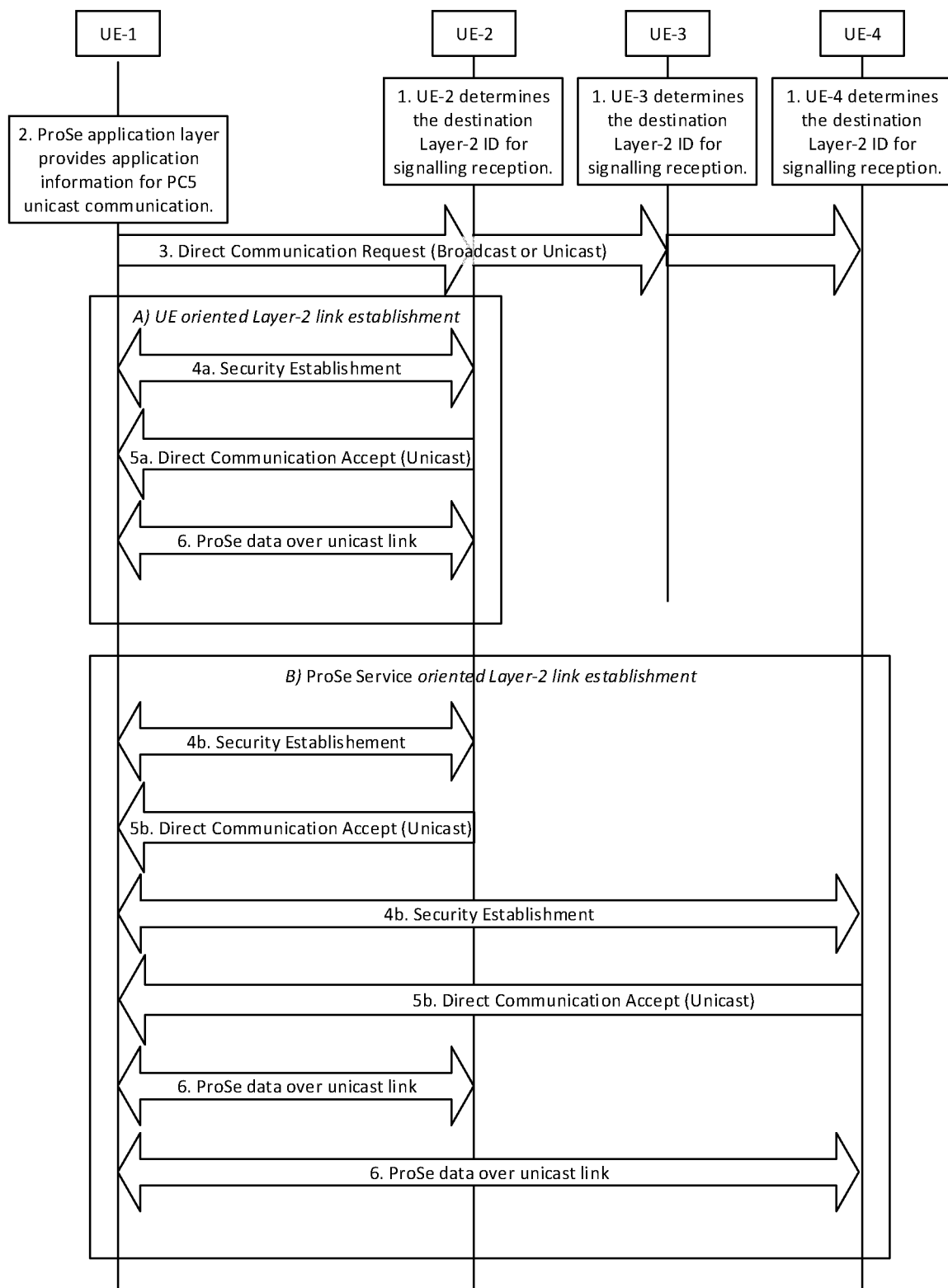
FIG. 9 is a reproduction of FIG. 6.4.3.1-1 of 3GPP TS 23.304 V17.3.0.

[FIG. 6.4.3.1-1 of 3GPP TS 23.304 V17.3.0, Entitled "Layer-2 Link Establishment Procedure", is Reproduced as FIG. 9]

1. The UE(s) determine the destination Layer-2 ID for signalling reception for PC5 unicast link establishment as specified in clause 5.8.2.4.
2. The ProSe application layer in UE-1 provides application information for PC5 unicast communication. The application information includes the ProSe Service Info, UE's Application Layer ID. The target UE's Application Layer ID may be included in the application information.
   The ProSe application layer in UE-1 may provide ProSe Application Requirements for this unicast communication. UE-1 determines the PC5 QoS parameters and PFI as specified in clause 5.6.1.
   If UE-1 decides to reuse the existing PC5 unicast link as specified in clause 5.3.4, the UE triggers the Layer-2 link modification procedure as specified in clause 6.4.3.4.
3. UE-1 sends a Direct Communication Request message to initiate the unicast layer-2 link establishment procedure. The Direct Communication Request message includes:
   Source User Info: the initiating UE's Application Layer ID (i.e. UE-1's Application Layer ID).
   If the ProSe application layer provided the target UE's Application Layer ID in step 2, the following information is included:
      Target User Info: the target UE's Application Layer ID (i.e. UE-2's Application Layer ID).
   ProSe Service Info: the information about the ProSe identifier(s) requesting Layer-2 link establishment.
   Security Information: the information for the establishment of security.
   NOTE 1: The Security Information and the necessary protection of the Source User Info and Target User Info are defined by SA WG3.
      The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.
      UE-1 sends the Direct Communication Request message via PC5 broadcast or unicast using the source Layer-2 ID and the destination Layer-2 ID.
      A default PC5 DRX configuration may be used for transmitting and receiving of this message.
4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced ProSe Service(s) over a PC5 unicast link with UE-1 responds by establishing the security with UE-1.
   NOTE 2: The signalling for the Security Procedure is defined by SA WG3.
      When the security protection is enabled, UE-1 sends the following information to the target UE:
      If IP communication is used:
         IP Address Configuration: For IP communication, IP address configuration is required for this link and indicates one of the following values:
            "DHCPv4 server" if only IPv4 address allocation mechanism is supported by the initiating UE, i.e., acting as a DHCPv4 server; or
            "IPv6 Router" if only IPv6 address allocation mechanism is supported by the initiating UE, i.e., acting as an IPv6 Router; or
            "DHCPv4 server & IPv6 Router" if both IPv4 and IPv6 address allocation mechanism are supported by the initiating UE; or
            "address allocation not supported" if neither IPv4 nor IPv6 address allocation mechanism is supported by the initiating UE.
         Link-Local IPv6 Address: a link-local IPv6 address formed locally based on RFC 4862 [17] if UE-1 does not support the IPv6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).

Optional PC5 QoS Rule(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPv6 Router; or "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 [17] if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Two UEs may negotiate the PC5 DRX configuration in the AS layer, and the PC5 DRX parameter values can be configured per pair of source and destination Layer-2 IDs in the AS layer.

6. ProSe data is transmitted over the established unicast link as below:

The PC5 Link Identifier and PFI are provided to the AS layer, together with the ProSe data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

6.4.3.4 Layer-2 Link Modification for a Unicast Link

FIG. 6.4.3.4-1 shows the layer-2 link modification procedure for a unicast link. This procedure is used to:

add new PC5 QoS Flow(s) in the existing PC5 unicast link.

This covers the case for adding new PC5 QoS Flow(s) to the existing ProSe service(s) as well as the case for adding new PC5 QoS Flow(s) to new ProSe service (s).

modify existing PC5 QoS Flow(s) in the existing PC5 unicast link.

This covers the case for modifying the PC5 QoS parameters for existing PC5 QoS Flow(s).

This also covers the case for removing the associated ProSe service(s) from existing PC5 QoS Flow(s) as well as the case for associating new ProSe service(s) with existing PC5 QoS Flow(s).

remove existing PC5 QoS Flow(s) in the existing PC5 unicast link.

Figure 10:
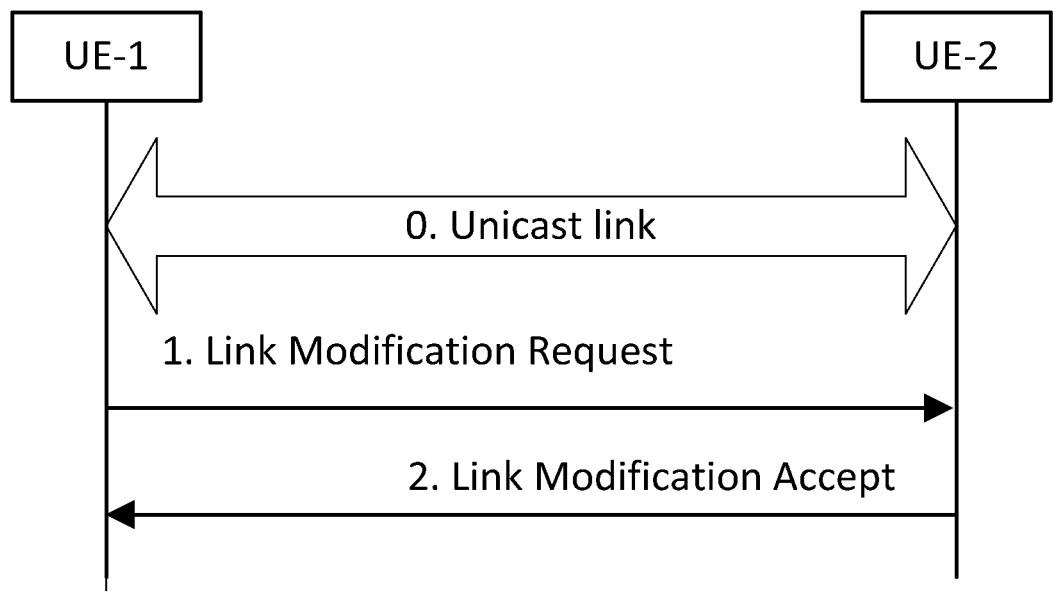
FIG. 10 is a reproduction of FIG. 6.4.3.4-1 of 3GPP TS 23.304 V17.3.0.

[FIG. 6.4.3.4-1 of 3GPP TS 23.304 V17.3.0, entitled "Layer-2 link modification procedure", is reproduced as FIG. 10]

0. UE-1 and UE-2 have a unicast link established as described in clause 6.4.3.1.

1. The ProSe application layer in UE-1 provides application information for PC5 unicast communication. The application information includes the ProSe Service Info and the initiating UE's Application Layer ID. The target UE's Application Layer ID may be included in the application information. If UE-1 decides to reuse the existing PC5 unicast link as specified in clause 5.3.4, so decides to modify the unicast link established with UE-2, UE-1 sends a Link Modification Request to UE-2.

The Link Modification Request message includes:
a) To add new PC5 QoS Flow(s) in the existing PC5 unicast link:
   QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and optionally the associated ProSe identifier(s).
   Optional PC5 QoS Rule(s).
b) To modify PC5 QoS Flow(s) in the existing PC5 unicast link:
   QoS Info: the information about PC5 QoS Flow(s) to be modified. For each PC5 QoS Flow, the PFI, the corresponding PC5 QoS parameters (i.e. PQI and conditionally other parameters such as MFBR/GFBR, etc.) and optionally the associated ProSe identifier(s).
   Optional PC5 QoS Rule(s).
c) To remove PC5 QoS Flow(s) in the existing PC5 unicast link:
   PFIs.
2. UE-2 responds with a Link Modification Accept message.

The Link Modification Accept message includes:
For case a) and case b) described in step 1:
   QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and optionally the associated ProSe identifier(s).
   Optional PC5 QoS Rule(s).

The ProSe layer of each UE provides information about the unicast link modification to the AS layer. This enables the AS layer to update the context related to the modified unicast link.

6.4.3.6 Layer-2 Link Management Over PC5 Reference Point for 5G ProSe UE-to-Network Relay The Layer-2 link procedures over PC5 reference point for unicast mode 5G ProSe Direct Communication as depicted from clause 6.4.3.1 to clause 6.4.3.5 can be used for the PC5 reference point between 5G ProSe Remote UE and 5G ProSe UE-to-Network Relay, with the following differences and clarifications:

The Layer-2 link modification procedure is applicable to ProSe Communication via 5G ProSe Layer-3 UE-to-Network Relay, other procedures are applicable to both ProSe Communication via 5G ProSe Layer-2 UE-to-Network Relay and ProSe Communication via 5G ProSe Layer-3 UE-to-Network Relay.

The UE oriented Layer-2 link establishment is used with UE-1 representing the 5G ProSe Remote UE and UE-2 representing the 5G ProSe UE-to-Network Relay. For other procedures either UE-1 represents the 5G ProSe Remote UE and UE-2 represents the 5G ProSe UE-to-Network Relay, or UE-1 represents the 5G ProSe UE-to-Network Relay and UE-2 represents the 5G ProSe Remote UE. I.e. the Layer-2 link establishment is initiated by the 5G ProSe Remote UE, while other procedures may be initiated either by the 5G ProSe Remote UE or by the 5G ProSe UE-to-Network Relay.

For the UE oriented Layer-2 link establishment as described in the clause 6.4.3.1,
   In step 1, the 5G ProSe Remote UE determines the destination Layer-2 ID for PC5 unicast link establishment based on the unicast source Layer-2 ID of the selected 5G ProSe UE-to-Network Relay (as specified in clause 5.8.3) during UE-to-Network Relay discovery as specified in clause 6.3.2.3.
   In step 2, 5G ProSe Remote UE (UE-1) determines the Relay Service Code to be used. The Relay Service Code to be used is selected from the received Relay Service Code(s) during UE-to-Network Relay discovery as specified in clause 6.3.2.3.
   In step 3, 5G ProSe Remote UE (UE-1) sends a unicast Direct Communication Request message to the selected 5G ProSe UE-to-Network Relay. The destination Layer-2 ID used to send the Direct Communication Request message shall be unicast Layer-2 ID as determined in step 1. The Direct Communication Request message includes:
   Source User Info: the identity of the Remote UE requesting relay operation (i.e. User Info ID).
   NOTE 1: The details of which additional identity/identities of the Remote UE to be included during Layer-2 link establishment will be decided by SA WG3.
   Target User Info: the identity of the UE-to-Network Relay provided to the 5G ProSe Remote UE during UE-to-Network Relay Discovery procedure (i.e. User Info ID).
   Relay Service Code: indicates the connectivity service provided by the 5G ProSe UE-to-Network Relay as requested by the 5G ProSe Remote UE.
   Security Information: the information for the establishment of security.
   In step 4 and step 5, step 4a and step 5a are performed if the 5G ProSe UE-to-Network Relay's identity matches the Target User Info and the Relay Service Code is one of the Relay Service Codes included during UE-to-Network Relay discovery as specified in clause 6.3.2.3. The Source User Info in the Direct Communication Accept message is the identity of the UE-to-Network Relay (i.e. User Info ID). In the case of 5G ProSe Layer-2 UE-to-Network Relay, the Remote UE does not send the IP Address Configuration, Link-Local IPv6 Address and QoS Info to the 5G ProSe Layer-2 UE-to-Network Relay, and the Direct Communication Accept message does not include IP Address Configuration, Link-Local IPv6 Address and QoS Info. In the case of 5G ProSe Layer-3 UE-to-Network Relay, the Direct Communication Accept message does not include the IP Address Configuration indicating the value "address allocation not supported".
   In the case of 5G ProSe Layer-2 UE-to-Network Relay, step 6 is not performed.

For the link identifier update as described in the clause 6.4.3.2,
   Application Layer ID is replaced by User Info ID.
   In the case of 5G ProSe Layer-2 UE-to-Network Relay, the changed identifiers do not include IP address/prefix.

For the Layer-2 link release as described in the clause 6.4.3.3,
   In step 1, if the Layer-2 link release procedure is initiated by the 5G ProSe UE-to-Network Relay, the Disconnect Request message may indicate the 5G ProSe UE-to-Network Relay is temporarily not available as described in clause 5.12.

NOTE 2: The form of the temporarily not available indication will be determined by stage 3.

If the service authorization for acting as a 5G ProSe Remote UE or as a 5G ProSe UE-to-Network Relay is revoked, the 5G ProSe Remote UE or the 5G ProSe UE-to-Network Relay should initiate the release of the layer-2 link that the revoked authorization affects.

A 5G ProSe Layer-2 Remote UE or a 5G ProSe Layer-2 UE-to-Network Relay initiates the release of the layer-2 link upon receiving the indication from its AS layer that PC5-RRC connection has been released as specified in TS 38.300 [12].

NOTE 3: The timing to initiates layer-2 link release is up to UE implementation.

A 5G ProSe Remote UE and a 5G ProSe UE-to-Network Relay shall set up a separate PC5 unicast links if an existing unicast link(s) was established with a different Relay Service Code or without a Relay Service Code.

Each PC5 unicast link for 5G ProSe UE-to-Network Relay is associated with a Unicast Link Profile, which includes:

User Info ID and Layer-2 ID of 5G ProSe Remote UE; and

User Info ID and Layer-2 ID of 5G ProSe UE-to-Network Relay; and

Relay Service Code; and

In the case of 5G ProSe Layer-3 UE-to-Network Relay, the network layer protocol and the information about PC5 QoS Flow(s).

The Unicast Link Profile shall be updated accordingly after a Layer-2 link modification or Layer-2 link identifier update.

6.5.1.1 5G ProSe Communication Via 5G ProSe Layer-3 UE-to-Network Relay without N3IWF A 5G ProSe Layer-3 UE-to-Network Relay registers to the network (if not already registered). 5G ProSe Layer-3 UE-to-Network Relay establishes a PDU Session(s) or modifies an existing PDU Session(s) in order to provide relay traffic towards 5G ProSe Layer-3 Remote UE(s). PDU Session(s) supporting 5G ProSe Layer-3 UE-to-Network Relay shall only be used for 5G ProSe Layer-3 Remote UE(s) relay traffic.

The PLMN serving the 5G ProSe Layer-3 UE-to-Network Relay and the PLMN to which the 5G ProSe Layer-3 Remote UE registers can be the same PLMN or two different PLMNs.

Figure 11:
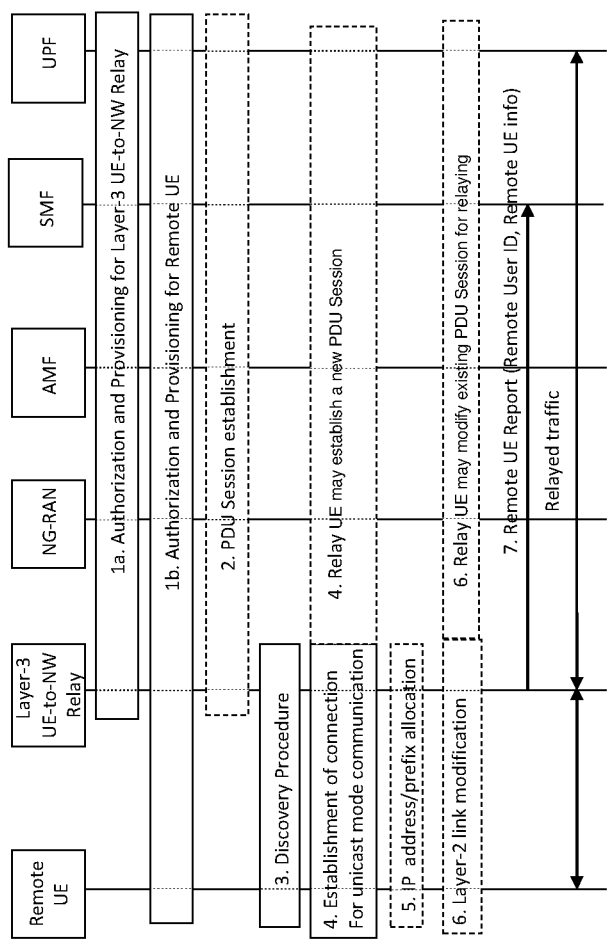
FIG. 11 is a reproduction of FIG. 6.5.1.1-1 of 3GPP TS 23.304 V17.3.0.

[FIG. 6.5.1.1-1 of 3GPP TS 23.304 V17.3.0, Entitled "5G ProSe Communication Via 5G ProSe Layer-3 UE-to-Network Relay without N3IWF", is Reproduced as FIG. 11]

1. Service authorization and provisioning are performed for the 5G ProSe Layer-3 UE-to-Network Relay (step 1a) and 5G ProSe Layer-3 Remote UE (step 1b) as described in clause 6.2.

2. The 5G ProSe Layer-3 UE-to-Network Relay may establish a PDU Session for relaying. In the case of IPv6, the 5G ProSe Layer-3 UE-to-Network Relay obtains the IPv6 prefix via prefix delegation function from the network as defined in TS 23.501 [4].

NOTE 1: 5G ProSe Layer-3 UE-to-Network Relay can establish a PDU Session for any Relay Service Code it supports before the connection is established with the 5G ProSe Layer-3 Remote UE.

3. The 5G ProSe Layer-3 Remote UE performs discovery of a 5G ProSe Layer-3 UE-to-Network Relay as described in clause 6.3.2.3. As part of the discovery procedure the 5G ProSe Layer-3 Remote UE learns about the connectivity service the 5G ProSe Layer-3 UE-to-Network Relay provides.

4. The 5G ProSe Layer-3 Remote UE selects a 5G ProSe Layer-3 UE-to-Network Relay and establishes a connection for unicast mode communication as described in clause 6.4.3.6. If there is no PDU Session associated with the Relay Service Code or a new PDU Session for relaying is needed, the 5G ProSe Layer-3 UE-to-Network Relay initiates a new PDU Session establishment procedure for relaying before completing the PC5 connection establishment.

The network decides that the PDU session to be established is for relay traffic, and then generates the QoS rules and QoS Flow level QoS parameters to 5G ProSe Layer-3 UE-to-Network Relay with relay consideration and can initiate the setup of QoS flows as specified in clause 5.6.2.1. The Remote UE can also initiate the setup of QoS flows by providing PC5 QoS info and (optionally) PC5 QoS rule(s) to the 5G ProSe Layer-3 UE-to-Network Relay during connection setup, according to the procedure as specified in clause 5.6.2.1.

The 5G ProSe Layer-3 UE-to-Network Relay determines the PDU Session type for relaying as specified in clause 5.4.1.1.

According to the PDU Session Type for relaying, the 5G ProSe Layer-3 UE-to-Network Relay performs relaying function at the corresponding layer as follows:

When the IP type PDU Session is used for IP traffic over PC5 reference point, the 5G ProSe Layer-3 UE-to-Network Relay acts as an IP router. For IPv4, the 5G ProSe Layer-3 UE-to-Network Relay performs IPv4 NAT between IPv4 addresses assigned to the 5G ProSe Layer-3 Remote UE and the IPv4 address assigned to the PDU Session used for the relay traffic.

When the Ethernet type PDU Session is used for Ethernet traffic over PC5 reference point, the 5G ProSe Layer-3 UE-to-Network Relay acts as an Ethernet switch.

When the Unstructured type PDU Session is used for Unstructured traffic over PC5 reference point, the 5G ProSe Layer-3 UE-to-Network Relay performs traffic relaying based on a mapping between the PC5 Link Identifier and the PDU Session ID, and a mapping between PFI for PC5 Layer-2 link and the QFI for the PDU Session. These mappings are created when the Unstructured type PDU Session is established for the 5G ProSe Layer-3 Remote UE.

When the IP type PDU Session is used for Ethernet or Unstructured traffic over PC5 reference point, the 5G ProSe Layer-3 UE-to-Network Relay uses IP tunneling. For this IP tunnelling, the 5G ProSe Layer-3 UE-to-Network Relay locally assigns an IP address/prefix for the 5G ProSe Layer-3 Remote UE and uses it on the Uu reference point to encapsulate and decapsulate the uplink and downlink traffic for the 5G ProSe Layer-3 Remote UE. The tunneled traffic over Uu reference point is transported over the PC5 reference point as Ethernet or Unstructured traffic.

5. For IP PDU Session Type and IP traffic over PC5 reference point, IPv6 prefix or IPv4 address (including NAT case) is allocated for the 5G ProSe Layer-3 Remote UE as defined in clause 5.5.1.3.
6. The 5G ProSe Layer-3 Remote UE may provide PC5 QoS Info and PC5 QoS rule(s) to the 5G ProSe Layer-3 UE-to-Network Relay using Layer-2 link modification procedure as specified in clause 6.4.3.4. The 5G ProSe Layer-3 UE-to-Network Relay generates the Packet Filters used over Uu interface based on the received PC5 QoS Info and QoS Rule(s) as described in clause 5.6.2.1, and may perform the UE requested PDU Session Modification as defined in TS 23.502 [5] clause 4.3.3 to setup a new QoS Flow or bind the traffic to an existing QoS Flow.

From this point the uplink and downlink relaying can start. For downlink traffic forwarding, the PC5 QoS Rule is used to map the downlink packet to the PC5 QoS Flow. For uplink traffic forwarding, the 5G QoS Rule is used to map the uplink packet to the Uu QoS Flow.

7. The 5G ProSe Layer-3 UE-to-Network Relay shall send a Remote UE Report (Remote User ID, Remote UE info) message to the SMF for the PDU Session associated with the relay. The Remote User ID is an identity of the 5G ProSe Layer-3 Remote UE user that was successfully connected in step 4. The Remote UE info is used to assist identifying the 5G ProSe Layer-3 Remote UE in the 5GC. For IP PDU Session Type, the Remote UE info is Remote UE IP info. For Ethernet PDU Session Type, the Remote UE info is Remote UE MAC address which is detected by the 5G ProSe Layer-3 UE-to-Network Relay. For Unstructured PDU Session Type, the Remote UE info is not included. The SMF stores the Remote User IDs and the related Remote UE info in the 5G ProSe Layer-3 UE-to-Network Relay's SM context for this PDU Session associated with the relay.

The Remote UE Report is N1 SM NAS message sent with the PDU Session ID to the AMF, in turn delivered to the SMF.

NOTE 2: The privacy protection for Remote User ID depends on SA WG3 design.

For IP info the following principles apply:
  for IPv4, the 5G ProSe Layer-3 UE-to-Network Relay shall report TCP/UDP port ranges assigned to individual 5G ProSe Layer-3 Remote UE(s) (along with the Remote User ID);
  for IPv6, the 5G ProSe Layer-3 UE-to-Network Relay shall report IPv6 prefix(es) assigned to individual 5G ProSe Layer-3 Remote UE(s) (along with the Remote User ID).

If the PDU Session for relaying is released by the UE-to-Network Relay or the network as described in clause 4.3.4 of TS 23.502 [5], the UE-to-Network Relay should initiate the release of the layer-2 links associated with the released PDU Session using the procedure defined in clause 6.4.3.3.

The PDU Session(s) used for relaying should be released as described in clause 4.3.4 of TS 23.502 [5] (e.g. by 5G ProSe Layer-3 UE-to-Network Relay), if the service authorization for acting as a 5G ProSe Layer-3 UE-to-Network Relay in the serving PLMN is revoked.

The 5G ProSe Layer-3 UE-to-Network Relay shall send the Remote UE Report message when the 5G ProSe Layer-3 Remote UE disconnects from the 5G ProSe Layer-3 UE-to-Network Relay (e.g. upon explicit layer-2 link release or based on the absence of keep alive messages over PC5) to inform the SMF that the 5G ProSe Layer-3 Remote UE(s) have left.

NOTE 3: In order for the SMF to have the 5G ProSe Layer-3 Remote UE(s) information, the HPLMN and the VPLMN where the 5G ProSe Layer-3 UE-to-Network Relay is authorised to operate, needs to support the transfer of the 5G ProSe Layer-3 Remote UE related parameters if the SMF is in the HPLMN.

It is up to 5G ProSe Layer-3 UE-to-Network Relay implementation how PDU Session(s) used for relaying are released or QoS Flow(s) used for relaying are removed by the 5G ProSe Layer-3 UE-to-Network Relay when 5G ProSe Layer-3 Remote UE(s) disconnect from the 5G ProSe Layer-3 UE-to-Network Relay.

3GPP TR 24.554 specifies detailed ProSe direct link modification procedure and QoS handling related to Layer-3 UE-to-Network Relay operations as follows:

7.2.3 5G ProSe Direct Link Modification Procedure
7.2.3.1 General

The purpose of the 5G ProSe direct link modification procedure is to modify the existing ProSe direct link to:
  a) add new PC5 QoS flow(s) to the existing 5G ProSe direct link;
  b) modify existing PC5 QoS flow(s) for updating PC5 QoS parameters of the existing PC5 QoS flow(s);
  c) modify existing PC5 QoS flow(s) for associating new ProSe application(s) with the existing PC5 QoS flow(s);
  d) modify existing PC5 QoS flow(s) for removing the associated ProSe application(s) from the existing PC5 QoS flow(s); or
  e) remove existing PC5 QoS flow(s) from the existing 5G ProSe direct link.

In this procedure, the UE sending the PROSE DIRECT LINK MODIFICATION REQUEST message is called the "initiating UE" and the other UE is called the "target UE".

NOTE: The 5G ProSe direct link modification procedure is not applicable for 5G ProSe layer-2 UE-to-network relay case.

7.2.3.2 5G ProSe Direct Link Modification Procedure Initiated by Initiating UE

The initiating UE shall meet the following pre-conditions before initiating this procedure for adding a new ProSe application to the existing 5G ProSe direct link:
  a) there is a 5G ProSe direct link between the initiating UE and the target UE;
  b) the pair of application layer IDs and the network layer protocol of this 5G ProSe direct link are identical to those required by the application layer in the initiating UE for this ProSe application; and
  c) the security policy corresponding to the ProSe identifier is aligned with the security policy of the existing 5G ProSe direct link.

After receiving the service data or request from the upper layers, the initiating UE shall perform the PC5 QoS flow match as specified in clause 7.2.8. If there is no matched PC5 QoS flow, the initiating UE shall derive the PC5 QoS parameters and assign the PQFI(s) for the PC5 QoS flows(s) to be established as specified in clause 7.2.7.

If the 5G ProSe direct link modification procedure is to add new PC5 QoS flow(s) to the existing 5G ProSe direct link, the initiating UE shall create a PROSE DIRECT LINK MODIFICATION REQUEST message. In this message, initiating UE:
  a) shall include the PQFI(s), the corresponding PC5 QoS parameters and optionally the ProSe identifier(s);

b) shall include the link modification operation code set to "Add new PC5 QoS flow(s) to the existing 5G ProSe direct link"; and c) may include the PC5 QoS rule(s) to indicate the packet filters of the PC5 QoS flow(s).

If the 5G ProSe direct link modification procedure is to modify the PC5 QoS parameters for existing PC5 QoS flow(s) in the existing 5G ProSe direct link, the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Modify PC5 QoS parameters of the existing PC5 QoS flow(s)"; and c) may include the PC5 QoS rule(s) to indicate the packet filters of the PC5 QoS flow(s).

If the 5G ProSe direct link modification procedure is to associate new ProSe application(s) with existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Associate new ProSe application(s) with existing PC5 QoS flow(s)"; and c) may include the PC5 QoS rule(s) to indicate the packet filters of the PC5 QoS flow(s).

If the PC5 5G ProSe direct link modification procedure is to remove the associated ProSe application(s) from existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters including the ProSe identifier(s); and b) shall include the link modification operation code set to "Remove ProSe application(s) from existing PC5 QoS flow(s)".

If the direct link modification procedure is to remove any PC5 QoS flow(s) from the existing 5G ProSe direct link, the initiating UE shall create a PROSE DIRECT LINK MODIFICATION REQUEST message. In this message, the initiating UE:

a) shall include the PQFI(s); and b) shall include the link modification operation code set to "Remove existing PC5 QoS flow(s) from the existing 5G ProSe direct link".

After the PROSE DIRECT LINK MODIFICATION REQUEST message is generated, the initiating UE shall pass this message to the lower layers for transmission along with the initiating UE's layer-2 ID for 5G ProSe direct communication and the target UE's layer-2 ID for 5G ProSe direct communication and start timer T5081. The UE shall not send a new PROSE DIRECT LINK MODIFICATION REQUEST message to the same target UE while timer T5081 is running.

Figure 12:
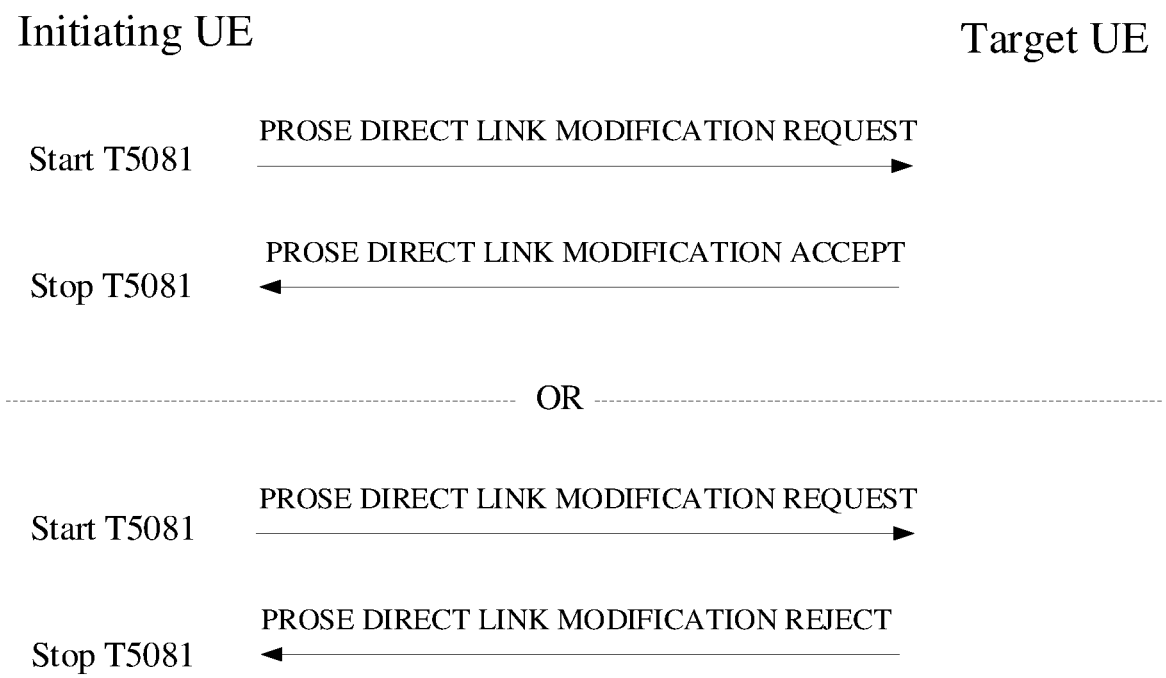
FIG. 12 is a reproduction of FIG. 7.2.3.2.1 of 3GPP TR 24.554 V17.1.0.

[FIG. 7.2.3.2.1 of 3GPP TR 24.554 V17.1.0, Entitled "5G ProSe Direct Link Modification Procedure", is Reproduced as FIG. 12]

7.2.3.3 5G ProSe Direct Link Modification Procedure Accepted by the Target UE

If the PROSE DIRECT LINK MODIFICATION REQUEST message is accepted, the target UE shall respond with the DIRECT LINK MODIFICATION ACCEPT message.

If the PROSE DIRECT LINK MODIFICATION REQUEST message is to add a new ProSe application, add new PC5 QoS flow(s) or modify any existing PC5 QoS flow(s) in the 5G ProSe direct link, the target UE:

a) shall include the PQFI(s), the corresponding PC5 QoS parameters and optionally the ProSe identifier(s) that the target UE accepts; and b) may include the PC5 QoS rule(s) to indicate the packet filters of the PC5 QoS flow(s);

in the PROSE DIRECT LINK MODIFICATION ACCEPT message.

If the PROSE DIRECT LINK MODIFICATION REQUEST message is to remove an existing ProSe application from the 5G ProSe direct link, the target UE shall delete the ProSe identifier received in the PROSE DIRECT LINK MODIFICATION REQUEST message and the corresponding PQFI(s) and PC5 QoS parameters from the profile associated with the 5G ProSe direct link.

If the PROSE DIRECT LINK MODIFICATION REQUEST message is to remove existing PC5 QoS flow(s) from the PC5 5G ProSe direct link, the target UE shall delete the PQFI(s) and the corresponding PC5 QoS parameters from the profile associated with the 5G ProSe direct link.

If the PROSE DIRECT LINK MODIFICATION REQUEST message is to add a new ProSe application, add new PC5 QoS flow(s) or modify any existing PC5 QoS flow(s) in the 5G ProSe direct link, after sending the PROSE DIRECT LINK MODIFICATION ACCEPT message, the target UE shall provide the added or modified PQFI(s) and corresponding PC5 QoS parameters along with PC5 link identifier to the lower layer.

If the PROSE DIRECT LINK MODIFICATION REQUEST message is to remove an existing ProSe application or to remove the existing PC5 QoS flow(s) from the 5G ProSe direct link, after sending the PROSE DIRECT LINK MODIFICATION ACCEPT message, the target UE shall provide the removed PQFI(s) along with the PC5 link identifier to the lower layer.

If the target UE accepts the 5G ProSe direct link modification request, then the target UE may perform the PC5 QoS flow establishment over 5G ProSe direct link as specified in clause 7.2.7 and perform the PC5 QoS flow match over 5G ProSe direct link as specified in clause 7.2.8.

7.2.3.4 5G ProSe Direct Link Modification Procedure Completion by the Initiating UE Upon receipt of the PROSE DIRECT LINK MODIFICATION ACCEPT message, the initiating UE shall stop timer T5081.

Upon receipt of the PROSE DIRECT LINK MODIFICATION ACCEPT message, if the PROSE DIRECT LINK MODIFICATION REQUEST message is to add a new ProSe application, add new PC5 QoS flow(s) or modify any existing PC5 QoS flow(s) in the 5G ProSe direct link, the initiating UE shall provide the added or modified PQFI(s) and corresponding PC5 QoS parameters along with PC5 link identifier to the lower layer.

Upon receipt of the PROSE DIRECT LINK MODIFICATION ACCEPT message, if the PROSE DIRECT LINK MODIFICATION REQUEST message is to remove an existing ProSe application or to remove the existing PC5 QoS flow(s) from the 5G ProSe direct link, the initiating UE shall provide the removed PQFI(s) along with the PC5 link identifier to the lower layer.

In addition, the initiating UE may perform the PC5 QoS flow establishment over 5G ProSe direct link as specified in clause 7.2.7.

7.2.3.5 5G ProSe Direct Link Modification Procedure not Accepted by the Target UE If the 5G ProSe direct link modification request cannot be accepted, the target UE shall send a PROSE DIRECT LINK MODIFICATION REJECT message. The PROSE DIRECT LINK MODIFICATION REJECT message contains a PC5 signalling protocol cause IE set to one of the following cause values:

5 lack of resources for 5G ProSe direct link;
6 required service not allowed;
12 security policy not aligned;
16 lack of local capabilities; or
111 protocol error, unspecified.

If the target UE is not allowed to accept this request, e.g., because the ProSe application to be added is not allowed per the operator policy or configuration parameters for ProSe communication over PC5 as specified in clause 5.2.4, the target UE shall send a PROSE DIRECT LINK MODIFICATION REJECT message with PC5 signalling protocol cause value #6 "required service not allowed".

If the 5G ProSe direct link modification fails due to the congestion problems or other temporary lower layer problems causing resource constraints, the target UE shall send a PROSE DIRECT LINK MODIFICATION REJECT message with PC5 signalling protocol cause value #5 "lack of resources for 5G ProSe direct link".

If the link modification operation code is set to "Associate new ProSe application(s) with existing PC5 QoS flow(s)" and the security policy corresponding to the ProSe identifier(s) is not aligned with the security policy applied to the existing 5G ProSe direct link, then the target UE shall send a PROSE DIRECT LINK MODIFICATION REJECT message with PC5 signalling protocol cause value #12 "security policy not aligned".

If the link modification operation requires the addition of new PC5 QoS flow(s) but the target UE cannot support additional packet filters which would be required on the existing PDU session of the target UE, then the target UE shall send a PROSE DIRECT LINK MODIFICATION REJECT message with PC5 signalling protocol cause value #16 "lack of local capabilities".

For other reasons causing the failure of link modification, the target UE shall send a PROSE DIRECT LINK MODIFICATION REJECT message with PC5 signalling protocol cause value #111 "protocol error, unspecified".

Upon receipt of the PROSE DIRECT LINK MODIFICATION REJECT message, the initiating UE shall stop timer T5081 and abort the 5G ProSe direct link modification procedure. If the PC5 signalling protocol cause value in the PROSE DIRECT LINK MODIFICATION REJECT message is #11 "required service not allowed" or #5 "lack of resources for 5G ProSe direct link" or #12 "security policy not aligned", then the initiating UE shall not attempt to start 5G ProSe direct link modification with the same target UE to add the same ProSe application, or to add or modify the same PC5 QoS flow(s) at least for a time period T.

NOTE: The length of time period T is UE implementation specific and can be different for the case when the UE receives PC5 signalling protocol cause value #11 "required service not allowed" or when the UE receives PC5 signalling protocol cause value #5 "lack of resources for 5G ProSe direct link" or when the UE receives PC5 signalling protocol cause value #12 "security policy not aligned". The length of time period T is not less than 30 minutes.

7.2.3.6 Abnormal Cases at the Initiating UE

The following abnormal cases can be identified:

a) If timer T5081 expires, the initiating UE shall retransmit the PROSE DIRECT LINK MODIFICATION REQUEST message and restart timer T5081. After reaching the maximum number of allowed retransmissions, the initiating UE shall abort the 5G ProSe direct link modification procedure and may notify the upper layer that the target UE is unreachable.

NOTE 1: The maximum number of allowed retransmissions is UE implementation specific.

NOTE 2: After reaching the maximum number of allowed retransmissions, whether the initiating UE releases this 5G ProSe direct link depends on its implementation.

b) For the same 5G ProSe direct link, if the initiating UE receives a PROSE DIRECT LINK RELEASE REQUEST message after the initiation of UE-requested 5G ProSe direct link modification procedure, the initiating UE shall stop the timer T5081 and abort the 5G ProSe direct link modification procedure and proceed with the 5G ProSe direct link release procedure.

c) For the same 5G ProSe direct link, if the initiating UE receives a PROSE DIRECT LINK MODIFICATION REQUEST message during the 5G ProSe direct link modification procedure, the initiating UE shall stop the timer T5081 and abort the 5G ProSe direct link modification procedure. Following handling is implementation dependent, e.g., the initiating UE waits for an implementation dependent time for initiating a new 5G ProSe direct link modification procedure, if still needed.

NOTE 3: The implementation dependent timer value needs to be set to avoid further collisions (e.g., random timer value).

8.2.6.3 QoS Handling for 5G ProSe Layer-3 UE-to-Network Relay without N3IWF

8.2.6.3.1 General

The QoS handling by a 5G ProSe layer-3 UE-to-network relay without an N3IWF to achieve an end-to-end QoS between the 5G ProSe layer-3 remote UE and the network is described in clause 5.6.2.1 of 3GPP TS 23.304 [2].

For a 5G ProSe layer-3 remote UE accessing the network via a 5G ProSe layer-3 UE-to-network relay without N3IWF, the end-to-end QoS requirement between 5G ProSe layer-3 remote UE and the network can be satisfied by the corresponding QoS control:

a) QoS control between 5G ProSe layer-3 remote UE and 5G ProSe layer-3 UE-to-network relay UE (PC5 QoS control); and b) QoS control between 5G ProSe layer-3 UE-to-network relay UE and the network (Uu QoS control).

To achieve this, the QoS mapping can be pre-configured as specified in clause 5.2.5 or provided to the 5G ProSe UE-to-network relay UE by the PCF using Prose Policy as specified in clause 5.3.2.

8.2.6.3.2 QoS Flows Handling Initiated by the Network

For QoS flows setup initiated by the network, upon reception QoS rules and QoS flow level QoS parameters from the SMF, the 5G ProSe layer-3 UE-to-network relay UE:

a) shall determine the PQI based on the QoS mapping rules configured in clause 5.2.5;

b) shall set the GFBR value for the PC5 GBR QoS flow to the GFBR value from the SMF, if any;

c) shall set the MFBR value for the PC5 GBR QoS flow to the MFBR value from the SMF, if any;

d) shall set the averaging window value for the PC5 GBR QoS flow to the averaging value from the SMF, if any;

e) may derive the packet filter(s) used for PC5 QoS rule(s) from the packet filter(s) used over Uu reference; and f) may initiate the 5G ProSe direct link modification procedure(s) as defined in clause 7.2.3 to either update the existing PC5 QoS flow or to set up a new PC5 QoS flow. The 5G ProSe layer-3 UE-to-network relay UE may include the PC5 QoS rule(s) when initiating the 5G ProSe direct link modification procedure toward a 5G ProSe layer-3 remote UE for which the IP address associated to the 5G ProSe layer-3 remote UE is included in the packet filter(s) used over Uu.

Alternatively, for dynamic QoS handling of 5G ProSe layer-3 remote UE using reflective QoS mechanism, upon the 5G ProSe layer-3 UE-to-network relay UE receiving a downlink user data packet along with the Reflective QoS Indication (RQI) as specified in 3GPP TS 24.501 [11], the 5G ProSe layer-3 UE-to-network relay UE:

a) creates a derived QoS rule by reflective QoS in the UE as specified in clause 6.2.5.1.4, 3GPP TS 24.501 [11];

b) shall create a new derived PC5 QoS rule or update the existing derived PC5 QoS rule for the PC5 QoS flow based on the derived QoS rule from a);

c) shall determine the corresponding PQI for the PC5 QoS flow based on the QoS mapping rules as specified in clause 5.2.5 and the 5QI value that corresponds to the QFI of the QoS rule from b);

d) shall perform one of the following:
  1) if there is a PC5 QoS flow with the determined PQI, the 5G ProSe layer-3 UE-to-network relay UE shall perform the 5G ProSe direct link modification procedure as specified in clause 7.2.3 to associate the ProSe application on the existing PC5 QoS flow. The 5G ProSe layer-3 UE-to-network relay UE may include the PC5 QoS rule(s) associated with the updated PC5 QoS flow; or
  2) if there is no PC5 QoS flow with the determined PQI, the 5G ProSe layer-3 UE-to-network relay UE shall perform the 5G ProSe direct link modification procedure as specified in clause 7.2.3 to add a new PC5 QoS flow with the determined PQI and associate the ProSe application on the new PC5 QoS flow. The 5G ProSe layer-3 UE-to-network relay UE may include the PC5 QoS rule(s) associated with the newly added PC5 QoS flow.

When a derived QoS rule is deleted, the 5G ProSe layer-3 UE-to-network relay UE performs the 5G ProSe direct link modification procedure as specified in clause 7.2.3 to associate the ProSe application with a PC5 QoS flow such that the determined PQI maps to the 5QI of the signaled QoS rule.

8.2.6.3.3 PC5 QoS Flows Handling Initiated by the 5G ProSe Layer-3 Remote UE

For PC5 QoS flows setup or modification initiated by the 5G ProSe layer-3 remote UE, the 5G ProSe layer-3 remote UE shall provide the PC5 QoS flow context as defined in clause 7.2.7 to the 5G ProSe layer-3 UE-to-network relay UE to indicate the end-to-end QoS requirements for the traffic transmission between 5G ProSe layer-3 remote UE and the network.

In addition, if the 5G ProSe layer-3 remote UE wants to add new PC5 QoS flow(s) or modify the existing PC5 QoS flow(s) for IP traffic or Ethernet traffic, the 5G ProSe layer-3 remote UE may also provide the PC5 QoS rule(s) for the PC5 QoS flow(s) to be added or modified to the 5G ProSe layer-3 UE-to-network relay UE.

Upon reception of the PC5 QoS context from the 5G ProSe layer-3 remote UE, the 5G ProSe layer-3 UE-to-network relay UE:

a) shall perform one of the following:
  1) if the end-to-end QoS requirements can be supported by an entry in QoS mapping configured in clause 5.2.5, then the 5G ProSe layer-3 UE-to-network relay UE uses the 5QI of the entry for the Uu QoS control and uses the PQI of the entry for the PC5 QoS control; or
  2) if the end-to-end QoS requirements cannot be supported by any entry in QoS mapping configured in clause 5.2.5, then the 5G ProSe layer-3 UE-to-network relay UE determines the 5QI for the Uu QoS control and PQI for the PC5 QoS control based on its implementation;

b) shall provide the 5G ProSe layer-3 remote UE with the PQI determined in bullet a), the corresponding PC5 QoS parameters and the corresponding ProSe identifier(s);

c) optionally, derives the packet filter(s) used over Uu reference point if the 5G ProSe layer-3 UE-to-network relay UE received PC5 QoS rule(s) from 5G ProSe layer-3 remote UE;

d) if a new QoS flow needs to be established or the existing QoS flow(s) needs to be modified, shall perform UE-requested PDU session modification procedure as specified in clause 6.4.2 in 3GPP TS 24.501 [11] providing:
  1) the Requested QoS flow descriptions IE with the 5QI value determined in bullet a); or
  2) the Requested QoS rules IE with the packet filter(s) if packet filter(s) are derived in bullet c); and e) shall further update the corresponding PC5 QoS flow with the updated PQI value if the 5G ProSe layer-3 UE-to-network relay UE receives the authorized QoS flow descriptions with a 5QI value which is different from the 5QI value indicated by the 5G ProSe layer-3 UE-to-network relay UE as described in bullet d).

3GPP TS 24.501 specifies Protocol Data Unit (PDU) session modification procedures as follows:

6.3.2 Network-Requested PDU Session Modification Procedure 6.3.2.1 General

The purpose of the network-requested PDU session modification procedure is to enable the network to modify a PDU session, re-negotiate header compression configuration associated to a PDU session, convey a port management information container, to trigger EAS rediscovery, provide updated DNS server address(es) due to the newly selected local DNS server or the newly selected EASDF, provide updated ECS configuration information, remove joined UE from one or more MBS multicast sessions associated with a PDU session, update ATSSS parameters (e.g. ATSSS rules) or update the MBS service area of MBS multicast session that the UE has joined.

6.3.2.2 Network-Requested PDU Session Modification Procedure Initiation

In order to initiate the network-requested PDU session modification procedure, the SMF shall create a PDU SESSION MODIFICATION COMMAND message.

[ . . . ]

Figure 13:
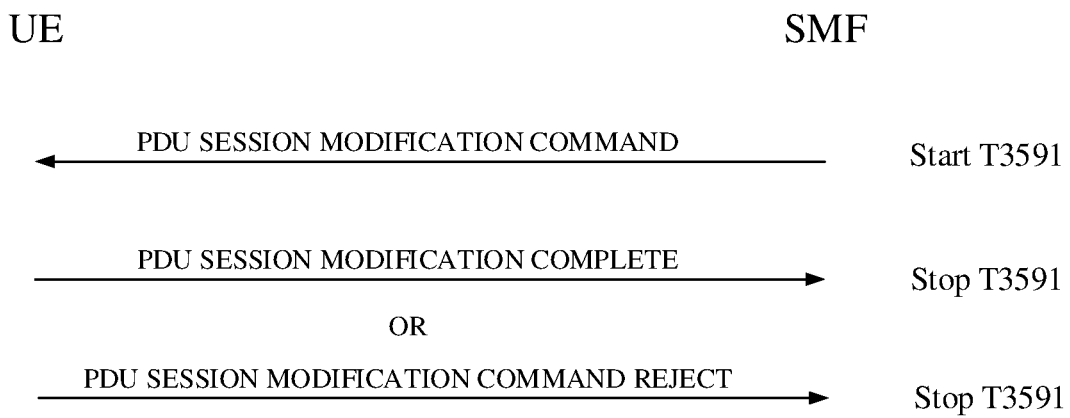
FIG. 13 is a reproduction of FIG. 6.3.2.2.1 of 3GPP TS 24.501 V17.6.1

[FIG. 6.3.2.2.1 of 3GPP TS 24.501 V17.6.1, Entitled "Network-Requested PDU Session Modification Procedure", is Reproduced as FIG. 13]

[ . . . ]

6.4.2 UE-Requested PDU Session Modification Procedure 6.4.2.1 General

The purpose of the UE-requested PDU session modification procedure is:

a) to enable the UE to request modification of a PDU session;
b) to indicate a change of 3GPP PS data off UE status for a PDU session;
c) to revoke the previously indicated support for reflective QoS;
d) to request specific QoS handling and segregation of service data flows;
e) to indicate to the network the relevant 5GSM parameters and capabilities (e.g. the UE's 5GSM capabilities, whether the UE supports more than 16 packet filters, the maximum data rate per UE for user-plane integrity protection supported by the UE for uplink, the maximum data rate per UE for user-plane integrity protection supported by the UE for downlink and whether the UE requests the PDU session to be an always-on PDU session in the 5GS) for a PDN connection established when in S1 mode, after an inter-system change from S1 mode to N1 mode, if the UE is a UE operating in single-registration mode in a network supporting N26 interface and the UE has not previously successfully performed the UE-requested PDU session modification to indicate to the network the relevant 5GSM parameters and capabilities;
f) to delete one or more mapped EPS bearer contexts;
g) to convey a port management information container;
h) to re-negotiate header compression configuration associated to a PDU session using control plane CIoT 5GS optimization; or
i) to enable the UE to request to join or leave one or more MBS multicast sessions associated with a PDU session.
NOTE 1: The case c), d), e), f) and g) do not apply to PDU sessions associated with the control plane only indication.
NOTE 2: For case e), the procedure is attempted after the first inter-system change from S1 mode to N1 mode.

When the UE-requested PDU session modification procedure is used to indicate a change of 3GPP PS data off UE status for a PDU session (see subclause 6.2.10), the UE shall initiate the UE-requested PDU session modification procedure even if the UE is outside the LADN service area or the timer T3396, T3584, T3585 or the back-off timer is running or is deactivated. If the UE needs to revoke the previously indicated support for reflective QoS for a PDU session and timer T3396, T3584, T3585 or the back-off timer is running or is deactivated, the UE shall not initiate the UE-requested PDU session modification procedure and shall instead initiate the UE-requested PDU session release procedure.

If the UE needs to initiate the UE-requested PDU session modification procedure to indicate to the network the relevant 5GSM parameters and capabilities (e.g. the UE's 5GSM capabilities, whether the UE supports more than 16 packet filters, the maximum data rate per UE for user-plane integrity protection supported by the UE for uplink, the maximum data rate per UE for user-plane integrity protection supported by the UE for downlink and whether the UE requests the PDU session to be an always-on PDU session in the 5GS) for a PDN connection established when in S1 mode, after an inter-system change from S1 mode to N1 mode, the UE is a UE operating in single-registration mode in the network supporting N26 interface, the UE has not previously successfully performed the UE-requested PDU session modification to indicate to the network the relevant 5GSM parameters and capabilities, and:
a) timer T3396, T3584, T3585 or the back-off timer is running, the UE shall initiate the UE-requested PDU session modification procedure after expiry of timer T3396, T3584 or T3585 or after expiry of the back-off timer; or
b) the UE is in substrate 5GMM-REGISTERED.NON-ALLOWED-SERVICE and has not performed the UE-requested PDU session modification procedure (see subclause 5.3.5), the UE shall initiate the UE-requested PDU session modification procedure after entering substrate 5GMM-REGISTERED.NORMAL-SERVICE.

6.4.2.2 UE-Requested PDU Session Modification Procedure Initiation

In order to initiate the UE-requested PDU session modification procedure, the UE shall create a PDU SESSION MODIFICATION REQUEST message.

The UE shall allocate a PTI value currently not used and shall set the PTI IE of the PDU SESSION MODIFICATION REQUEST message to the allocated PTI value.

The UE shall not perform the UE-requested PDU session modification procedure for an emergency PDU session, except for a procedure initiated according to subclause 6.4.2.1, item e) only, and for the error cases described in subclause 6.4.1.3 and subclause 6.3.2.3.

The UE shall not perform the UE-requested PDU session modification procedure for a PDU session for LADN when the UE is located outside the LADN service area except for indicating a change of 3GPP PS data off UE status.

If the UE requests a specific QoS handling and the PDU session is not associated with the control plane only indication, the UE shall include the Requested QoS rules IE indicating requested QoS rules or the Requested QoS flow descriptions IE indicating requested QoS flow descriptions or both for the specific QoS handling. The Requested QoS rules IE includes the packet filters which describe the service data flows requested by the UE. The specific QoS parameters requested by the UE are specified in the Requested QoS flow descriptions IE. If the UE requests the network to bind specific service data flows to a dedicated QoS flow, the UE shall create a new QoS rule by setting the rule operation code to "Create new QoS rule" and shall set the segregation bit to "Segregation requested" for the corresponding QoS rule in the Requested QoS rules IE. The UE shall set the QRI values to "no QoS rule identifier assigned" in the Requested QoS rules IE, if the QoS rules are newly created; otherwise, the UE shall set the QRI values to those of the existing QoS rules for which the specific QoS handling applies. The UE shall set the QFI values to "no QoS flow identifier assigned" in the Requested QoS flow descriptions IE, if the QoS flow descriptions are newly created; otherwise, the UE shall set the QFI values to the QFIs of the existing QoS flow descriptions for which the specific QoS handling applies. The UE shall not request to create more than one QoS flow in a UE-requested PDU session modification procedure. If the SMF receives a PDU SESSION MODIFICATION REQUEST message with a Requested QoS rules IE containing more than one QoS rule with the rule operation code set to "Create new QoS rule", the SMF shall assign the same QFI to all the QoS rules which are created.

If the UE requests to join or leave one or more MBS multicast sessions associated with a PDU session, the UE shall include the Requested MBS container IE in the PDU SESSION MODIFICATION REQUEST message and shall set the MBS operation to "Join MBS session" for the join case or to "Leave MBS session" for the leave case. The UE shall include the MBS session information(s) and shall set the Type of MBS session ID for each of the MBS session information to either "Temporary Mobile Group Identity (TMGI)" or "Source specific IP multicast address" depending on the type of the MBS session ID available in the UE. Then the remaining values of each of the MBS session informations shall be set as following:
- a) if the Type of MBS session ID is set to "Temporary Mobile Group Identity (TMGI)", the UE shall set the MBS session ID to the TMGI; or
- b) if the Type of MBS session ID is set to "Source specific IP multicast address for IPv4" or "Source specific IP multicast address for IPv6", the UE shall set the Source IP address information and the Destination IP address information to the corresponding values.

NOTE 1: The UE obtains the details of the MBS session ID(s) i.e. TMGI, Source IP address information and Destination IP address information as a pre-configuration in the UE or during the MBS service announcement which is out of scope of this specification.

For a PDN connection established when in S1 mode, after an inter-system change from S1 mode to N1 mode, if the UE is a UE operating in single-registration mode in a network supporting N26 interface, the PDU session is of "Pv4", "IPv6", "IPv4v6", or "Ethernet" PDU session type, the PDU session is not associated with the control plane only indication:
- a) the UE is performing the PDU session modification procedure to indicate the support of reflective QoS and the UE has not previously successfully performed the UE-requested PDU session modification to provide this indication, the UE shall set the RQoS bit to "Reflective QoS supported" in the 5GSM capability IE of the PDU SESSION MODIFICATION REQUEST message; or
- b) the UE is performing the PDU session modification procedure to indicate that reflective QoS is not supported and the UE has not previously successfully performed the UE-requested PDU session modification to provide this indication, the UE shall set the RQoS bit to "Reflective QoS not supported" in the 5GSM capability IE of the PDU SESSION MODIFICATION REQUEST message.

If the UE is performing the PDU session modification procedure to revoke the previously indicated support of reflective QoS and the PDU session is not associated with the control plane only indication, the UE shall set the RQoS bit to "Reflective QoS not supported" in the 5GSM capability IE of the PDU SESSION MODIFICATION REQUEST message. The UE shall not indicate support for reflective QoS for this PDU Session for the remaining lifetime of the PDU Session.

NOTE 2: The determination to revoke the usage of reflective QoS by the UE for a PDU session is implementation dependent.

For a PDN connection established when in S1 mode, after an inter-system change from S1 mode to N1 mode, if the UE is a UE operating in single-registration mode in a network supporting N26 interface, the PDU session is of "IPv6" or "IPv4v6" PDU session type, the PDU session is not associated with the control plane only indication:
- a) the UE is performing the PDU session modification procedure to indicate the support of Multi-homed IPv6 PDU session and the UE has not previously successfully performed the UE-requested PDU session modification to provide this indication, the UE shall set the MH6-PDU bit to "Multi-homed IPv6 PDU session supported" in the 5GSM capability IE of the PDU SESSION MODIFICATION REQUEST message; or
- b) the UE is performing the PDU session modification procedure to indicate that Multi-homed IPv6 PDU session is not supported and the UE has not previously successfully performed the UE-requested PDU session modification to provide this indication, the UE shall set the MH6-PDU bit to "Multi-homed IPv6 PDU session not supported" in the 5GSM capability IE of the PDU SESSION MODIFICATION REQUEST message.

For a PDN connection established when in S1 mode, after an inter-system change from S1 mode to N1 mode, if the UE is a UE operating in single-registration mode in a network supporting N26 interface, the PDU session is of "IPv4", "IPv6", "IPv4v6", or "Ethernet" PDU session type, the PDU session is not associated with the control plane only indication, the UE supports more than 16 packet filters for this PDU session, and the UE has not previously successfully performed the UE-requested PDU session modification to provide this indication, the UE shall indicate the maximum number of packet filters supported for the PDU session in the Maximum number of supported packet filters IE of the PDU SESSION MODIFICATION REQUEST message.

For a PDN connection established when in S1 mode, after an inter-system change from S1 mode to N1 mode, if the UE is a UE operating in single-registration mode in a network supporting N26 interface, the PDU session is not associated with the control plane only indication, and the UE has not previously successfully performed the UE-requested PDU session modification to include the Integrity protection maximum data rate IE in the PDU SESSION MODIFICATION REQUEST message, the UE shall include the Integrity protection maximum data rate IE in the PDU SESSION MODIFICATION REQUEST message.

If the UE is performing the PDU session modification procedure
- a) to request the deletion of a non-default QoS rule due to errors in QoS operations or packet filters;
- b) to request the deletion of a QoS flow description due to errors in QoS operations; or
- c) to request the deletion of a mapped EPS bearer context due to errors in mapped EPS bearer operation, TFT operation or packet filters, the UE shall include the 5GSM cause IE in the PDU SESSION MODIFICATION REQUEST message as described in subclauses 6.3.2.3, 6.3.2.4 and 6.4.1.3.

When the UE-requested PDU session modification procedure is used to indicate a change of 3GPP PS data off UE status for a PDU session, the UE shall include the Extended protocol configuration options IE in the PDU SESSION MODIFICATION REQUEST message and setting the 3GPP PS data off UE status.

For a PDN connection established when in S1 mode, after an inter-system change from S1 mode to N1 mode, if the UE is a UE operating in single-registration mode in a network supporting N26 interface, the PDU session is not associated with the control plane only indication, the UE requests the PDU session to be an always-on PDU session in the 5GS and the UE has not previously successfully performed the UE-requested PDU session modification to request this, the UE shall include the Always-on PDU session requested IE and set the value of the IE to "Always-on PDU session requested" in the PDU SESSION MODIFICATION REQUEST message.

If a port management information container needs to be delivered (see 3GPP TS 23.501 [8] and 3GPP TS 23.502 [9]), the UE shall include a Port management information container IE in the PDU SESSION MODIFICATION REQUEST message.

To request re-negotiation of IP header compression configuration, the UE shall include the IP header compression configuration IE in the PDU SESSION MODIFICATION REQUEST message if the network indicated "Control plane CIoT 5GS optimization supported" and "IP header compression for control plane CIoT 5GS optimization supported" in the 5GS network support feature support IE.

To request re-negotiation of Ethernet header compression configuration, the UE shall include the Ethernet header compression configuration IE in the PDU SESSION MODIFICATION REQUEST message if the network indicated "Control plane CIoT 5GS optimization supported" and "Ethernet header compression for control plane CIoT 5GS optimization supported" in the 5GS network support feature support IE.

After an inter-system change from S1 mode to N1 mode, if:
  a) the UE is operating in single-registration mode in the network supporting N26 interface;
  b) the PDU session type value of the PDU session type IE is set to "IPv4", "IPv6" or "IPv4v6";
  c) the UE indicates "Control plane CIoT 5GS optimization supported" and "IP header compression for control plane CIoT 5GS optimization supported" in the 5GMM capability IE of the REGISTRATION REQUEST message; and
  d) the network indicates "Control plane CIoT 5GS optimization supported" and "IP header compression for control plane CIoT 5GS optimization supported" in the 5GS network support feature IE of the REGISTRATION ACCEPT message;
the UE shall initiate the PDU session modification procedure to negotiate the IP header compression configuration and include the IP header compression configuration IE in the PDU SESSION MODIFICATION REQUEST message.

The UE shall include the Service-level-AA container IE in the PDU SESSION MODIFICATION REQUEST message, when requesting to modify an established PDU session for C2 communication. In the Service-level-AA container IE, the UE shall include:
  a) the service-level device ID with the value set to the CAA-level UAV ID of the UE; and
  b) if available, the service-level-AA payload with the value set to the C2 authorization payload and the service-level-AA payload type with the value set to "C2 authorization payload".
  NOTE 3: The C2 authorization payload in the service-level-AA payload can include the pairing information and the flight authorization information.

After an inter-system change from S1 mode to N1 mode, if:
  a) the UE is operating in single-registration mode in a network that supports N26 interface;
  b) the PDU session type value of the PDU session type IE is set to "Ethernet";
  c) the UE indicates "Control plane CIoT 5GS optimization supported" and "Ethernet header compression for control plane CIoT 5GS optimization supported" in the 5GMM capability IE of the REGISTRATION REQUEST message; and
  d) the network indicates "Control plane CIoT 5GS optimization supported" and "Ethernet header compression for control plane CIoT 5GS optimization supported" in the 5GS network support feature IE of the REGISTRATION ACCEPT message;
the UE shall initiate the PDU session modification procedure to negotiate the Ethernet header compression configuration and include the Ethernet header compression configuration IE in the PDU SESSION MODIFICATION REQUEST message.

For a PDN connection established when in S1 mode, after an inter-system change from S1 mode to N1 mode, and if the UE is a UE operating in single-registration mode in a network supporting N26 interface, and the UE supports provisioning of ECS configuration information to the EEC in the UE and the UE has not previously successfully performed the UE-requested PDU session modification to include the ECS configuration information provisioning support indicator, the UE shall include the Extended protocol configuration options IE in the PDU SESSION MODIFICATION REQUEST message and shall include the ECS configuration information provisioning support indicator.

For a PDN connection established when in S1 mode, after an inter-system change from S1 mode to N1 mode, and if the UE is a UE operating in single-registration mode in a network supporting N26 interface, and the UE supports receiving DNS server addresses in protocol configuration options and the UE has not previously successfully performed the UE-requested PDU session modification to indicate this support, the UE shall include the Extended protocol configuration options IE in the PDU SESSION MODIFICATION REQUEST message and:
  a) if the PDU session is of "IPv4" or "IPv4v6" PDU session type, the UE shall include the DNS server IPv4 address request; and
  b) if the PDU session is of "IPv6" or "IPv4v6" PDU session type, the UE shall include the DNS server IPv6 address request.

For a PDN connection established when in S1 mode, after an inter-system change from S1 mode to N1 mode, and if the UE is a UE operating in single-registration mode in a network supporting N26 interface, and the UE supports the EAS rediscovery and the UE has not previously successfully performed the UE-requested PDU session modification to indicate this support, the UE shall include the Extended protocol configuration options IE in the PDU SESSION MODIFICATION REQUEST message and shall include the EAS rediscovery support indication in the Extended protocol configuration options IE.

For a PDN connection established when in S1 mode, after an inter-system change from S1 mode to N1 mode, and if the UE is a UE operating in single-registration mode in a network supporting N26 interface, and the UE supports the EDC, then the UE shall include the Extended protocol configuration options IE in the PDU SESSION MODIFICATION REQUEST message and shall include the EDC support indicator in the Extended protocol configuration options IE.

The UE shall transport:
  a) the PDU SESSION MODIFICATION REQUEST message;
  b) the PDU session ID; and
  c) if the UE-requested PDU session modification:
    1) is not initiated to indicate a change of 3GPP PS data off UE status associated to a PDU session, then the request type set to "modification request"; and
    2) is initiated to indicate a change of 3GPP PS data off UE status associated to a PDU session, then without transporting the request type;
using the NAS transport procedure as specified in subclause 5.4.5, and the UE shall start timer T3581 (see example in FIG. 6.4.2.2.1).

For a PDN connection established when in S1 mode and not associated with the control plane only indication, after inter-system change from S1 mode to N1 mode, if the UE is registered in a network supporting the ATSSS,
- a) the UE may request to modify a PDU session to an MA PDU session; or
- b) the UE may allow the network to upgrade the PDU session to an MA PDU session. In order for the UE to allow the network to upgrade the PDU session to an MA PDU session, the UE shall set "MA PDU session network upgrade is allowed" in the MA PDU session information IE and set the request type to "modification request" in the UL NAS TRANSPORT message.

NOTE 4: If the DNN corresponds to an LADN DNN, the AMF does not forward the MA PDU session information IE to the SMF but sends the message back to the UE to inform of the unhandled request (see subclause 5.4.5.2.5).

In case the UE executes case a) or b):
1) if the UE supports ATSSS Low-Layer functionality with any steering mode as specified in subclause 5.32.6 of 3GPP TS 23.501 [8], the UE shall set the ATSSS-ST bits to "ATSSS Low-Layer functionality with any steering mode supported" in the 5GSM capability IE of the PDU SESSION MODIFICATION REQUEST message;
2) if the UE supports MPTCP functionality with any steering mode and ATSSS-LL functionality with only Active-Standby steering mode as specified in subclause 5.32.6 of 3GPP TS 23.501 [8], the UE shall set the ATSSS-ST bits to "MPTCP functionality with any steering mode and ATSSS-LL functionality with only Active-Standby steering mode supported" in the 5GSM capability IE of the PDU SESSION MODIFICATION REQUEST message;
3) if the UE supports MPTCP functionality with any steering mode and ATSSS-LL functionality with any steering mode as specified in subclause 5.32.6 of 3GPP TS 23.501 [8], the UE shall set the ATSSS-ST bits to "MPTCP functionality with any steering mode and ATSSS-LL functionality with any steering mode supported" in the 5GSM capability IE of the PDU SESSION MODIFICATION REQUEST message; and
4) if a performance measurement function in the UE can perform access performance measurements using the QoS flow of the non-default QoS rule as specified in subclause 5.32.5 of 3GPP TS 23.501 [8], the UE shall set the APMQF bit to "Access performance measurements per QoS flow supported" in the 5GSM capability IE of the PDU SESSION MODIFICATION REQUEST message.

Figure 14:
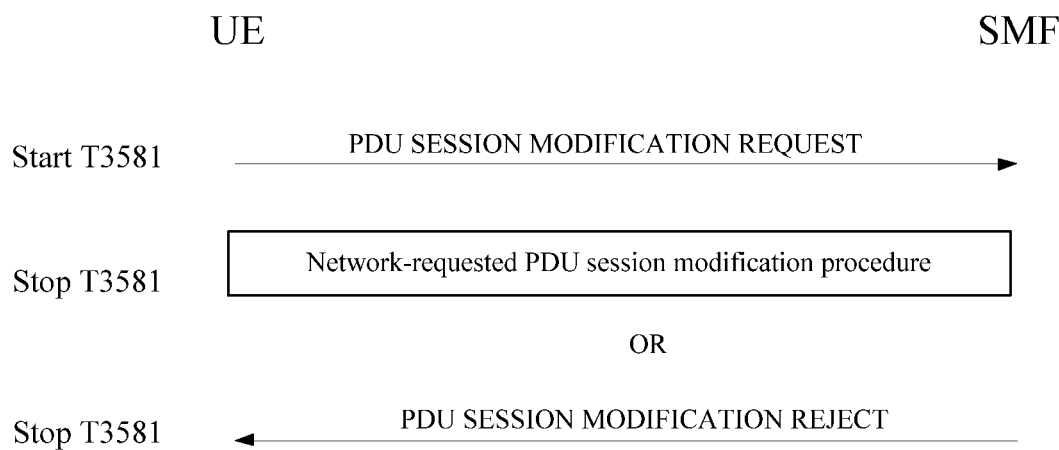
FIG. 14 is a reproduction of FIG. 6.4.2.2.1 of 3GPP TS 24.501 V17.6.1.

[FIG. 6.4.2.2.1 of 3GPP TS 24.501 V17.6.1, entitled "UE-requested PDU session modification procedure", is reproduced as FIG. 14]

6.4.2.3 UE-Requested PDU Session Modification Procedure Accepted by the Network

Upon receipt of a PDU SESSION MODIFICATION REQUEST message, if the SMF accepts the request to modify the PDU session, the SMF shall perform the network-requested PDU session modification procedure as specified in subclause 6.3.2.

If the PDU SESSION MODIFICATION REQUEST message contains a Port management information container IE, the SMF shall handle the contents of the Port management information container IE as specified in 3GPP TS 23.501 [8] and 3GPP TS 23.502 [9].

6.4.2.4 UE-Requested PDU Session Modification Procedure not Accepted by the Network 6.4.2.4.1 General Upon receipt of a PDU SESSION MODIFICATION REQUEST message, if the SMF does not accepts the request to modify the PDU session, the SMF shall create a PDU SESSION MODIFICATION REJECT message.

The SMF shall set the 5GSM cause IE of the PDU SESSION MODIFICATION REJECT message to indicate the reason for rejecting the PDU session modification.

The 5GSM cause IE typically indicates one of the following SM cause values:
- #26 insufficient resources;
- #29 user authentication or authorization failed;
- #31 request rejected, unspecified;
- #32 service option not supported;
- #33 requested service option not subscribed;
- #35 PTI already in use;
- #37 5GS QoS not accepted;
- #43 Invalid PDU session identity;
- #44 Semantic errors in packet filter(s);
- #45 Syntactical error in packet filter(s);
- #46 out of LADN service area;
- #59 unsupported 5QI value;
- #67 insufficient resources for specific slice and DNN;
- #69 insufficient resources for specific slice;
- #83 Semantic error in the QoS operation;
- #84 Syntactical error in the QoS operation; or
- #95-111 protocol errors.

If the UE requests a PDU session modification for an LADN when the UE is located outside of the LADN service area, the SMF shall include the 5GSM cause value #46 "out of LADN service area" in the 5GSM cause IE of the PDU SESSION MODIFICATION REJECT message.

If the Extended protocol configuration options IE of the PDU SESSION MODIFICATION REQUEST message indicates 3GPP PS data off UE status and the SMF detects the change of the 3GPP PS data off UE status, the SMF shall not include the 5GSM cause value #26 "insufficient resources", the 5GSM cause value #67 "insufficient resources for specific slice and DNN", the 5GSM cause value #69 "insufficient resources for specific slice" and the 5GSM cause value #46 "out of LADN service area" in the 5GSM cause IE of the PDU SESSION MODIFICATION REJECT message.

If the UE initiates UE-requested PDU session modification procedure to modify the PDU session transferred from EPS to an MA PDU session with the Request type IE set to "MA PDU request" in the UL NAS TRANSPORT message as specified in 3GPP TS 24.193 [13B] and the SMF determines, based on operator policy and subscription information, that the PDU SESSION MODIFICATION REQUEST message is to be rejected, the SMF shall include the 5GSM cause value #33 "requested service option not subscribed" in the 5GSM cause IE of the PDU SESSION MODIFICATION REJECT message.

NOTE: If the SMF determines, based on operator policy and subscription information, that the PDU SESSION MODIFICATION REQUEST message is to be accepted as single access PDU session, the ATSSS container IE cannot be included in the PDU SESSION MODIFICATION COMMAND message.

The network may include a Back-off timer value IE in the PDU SESSION MODIFICATION REJECT message.

If the 5GSM cause value is #26"insufficient resources", #67 "insufficient resources for specific slice and DNN", or #69 "insufficient resources for specific slice" and the PDU SESSION MODIFICATION REQUEST message was received from a UE configured for high priority access in selected PLMN or the request type provided during the PDU session establishment is set to "initial emergency request" or "existing emergency PDU session", the network shall not include a Back-off timer value IE.

The SMF shall send the PDU SESSION MODIFICATION REJECT message.

Upon receipt of a PDU SESSION MODIFICATION REJECT message and a PDU session ID, using the NAS transport procedure as specified in subclause 5.4.5, the UE shall stop timer T3581, release the allocated PTI value, and enter the state PROCEDURE TRANSACTION INACTIVE.

3GPP TS 38.331 specifies sidelink related operations as follows:

5.8.3 Sidelink UE Information for NR Sidelink Communication 5.8.3.1 General

Figure 15:
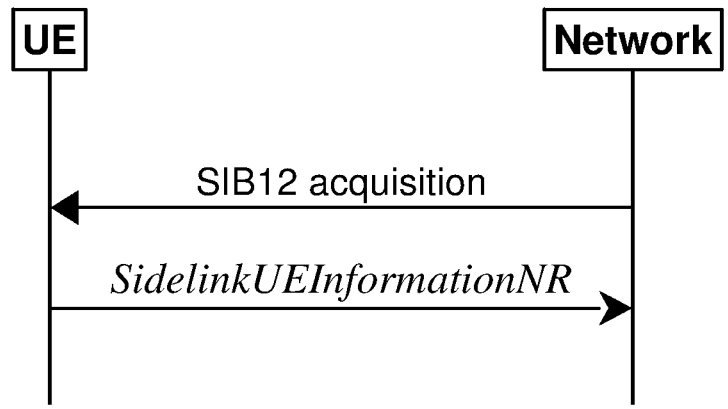
FIG. 15 is a reproduction of FIG. 5.8.3.1-1 of 3GPP TS 38.331 V17.0.0.

[FIG. 5.8.3.1-1 of 3GPP TS 38.331 V17.0.0, Entitled "Sidelink UE Information for NR Sidelink Communication", is Reproduced as FIG. 15]

The purpose of this procedure is to inform the network that the UE:
- is interested or no longer interested to receive or transmit NR sidelink communication,
- is requesting assignment or release of transmission resource for NR sidelink communication,
- is reporting QoS parameters and QoS profile(s) related to NR sidelink communication,
- is reporting that a sidelink radio link failure or sidelink RRC reconfiguration failure has been detected,
- is reporting the sidelink UE capability information of the associated peer UE for unicast communication,
- is reporting the RLC mode information of the sidelink data radio bearer(s) received from the associated peer UE for unicast communication,
- is reporting the sidelink DRX configuration received from the associated peer UE for NR sidelink unicast communication,
- is reporting the sidelink DRX assistance information received from the associated peer UE for NR sidelink unicast communication,
- is reporting, for NR sidelink groupcast or broadcast communication, [FFS on additional information],
- is reporting, for NR sidelink groupcast or broadcast communication, the Destination Layer-2 ID and QoS profile associated with its interested services that sidelink DRX is applied,
- is reporting DRX configuration reject information from its associated peer RX UE, when the UE is a TX UE and is performing sidelink operation with resource allocation mode 1,
- is reporting parameters related to U2N relay operation.

Editor's Note: FFS on the additional information/Tx profile, pending on reply from SA2 relate to WA "no additional RAN2 work if SA2 confirms it is feasible (whether the mapping from L2 id to TX profile is feasible in the gNB (like what we did in LTE)".

5.8.3.2 Initiation

A UE capable of NR sidelink communication or NR sidelink discovery or NR sidelink U2N relay operation that is in RRC_CONNECTED may initiate the procedure to indicate it is (interested in) receiving or transmitting NR sidelink communication or NR sidelink discovery or NR sidelink U2N relay operation in several cases including upon successful connection establishment or resuming, upon change of interest, upon changing QoS profiles, upon receiving UECapabilityInformationSidelink from the associated peer UE, upon RLC mode information updated from the associated peer UE or upon change to a PCell providing SIB12 including sl-ConfigCommonNR. A UE capable of NR sidelink communication may initiate the procedure to request assignment of dedicated sidelink DRB configuration and transmission resources for NR sidelink communication transmission. A UE capable of NR sidelink communication may initiate the procedure to report to the network that a sidelink radio link failure or sidelink RRC reconfiguration failure has been declared. A UE capable of NR sidelink discovery may initiate the procedure to request assignment of dedicated resources for sidelink discovery transmission or sidelink discovery reception. A UE capable of U2N relay operation may initiate the procedure to report/update parameters for acting as U2N Relay UE or U2N Remote UE (including L2 Remote UE's source L2 ID).

[ . . . ]

5.8.9.1 Sidelink RRC Reconfiguration 5.8.9.1.1 General

Figure 16:
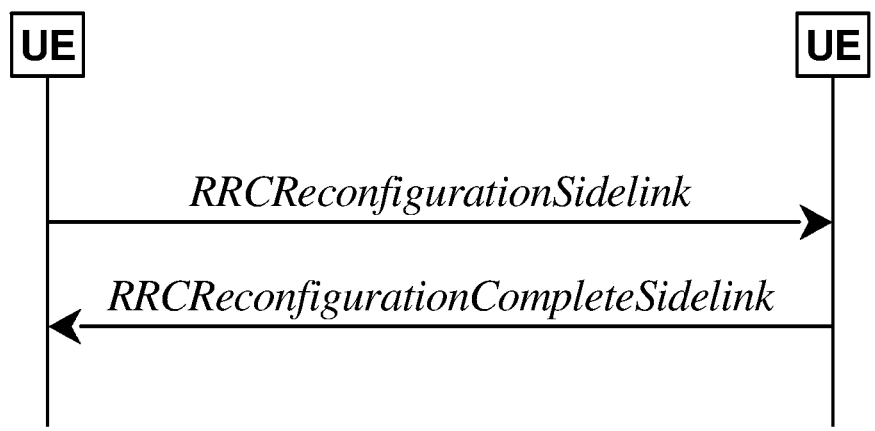
FIG. 16 is a reproduction of FIG. 5.8.9.1.1-1 of 3GPP TS 38.331 V17.0.0.

[FIG. 5.8.9.1.1-1 of 3GPP TS 38.331 V17.0.0, Entitled "Sidelink RRC Reconfiguration, Successful", is Reproduced as FIG. 16]

Figure 17:
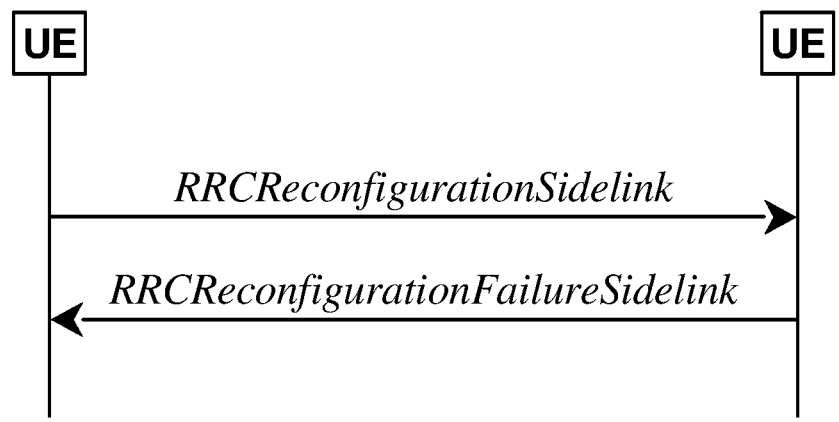
FIG. 17 is a reproduction of FIG. 5.8.9.1.1-2 of 3GPP TS 38.331 V17.0.0.

[FIG. 5.8.9.1.1-2 of 3GPP TS 38.331 V17.0.0, Entitled "Sidelink RRC Reconfiguration, Failure", is Reproduced as FIG. 17]

The purpose of this procedure is to modify a PC5-RRC connection, e.g. to establish/modify/release sidelink DRBs, to (re-)configure NR sidelink measurement and reporting, to (re-)configure sidelink CSI reference signal resources and CSI reporting latency bound.

The UE may initiate the sidelink RRC reconfiguration procedure and perform the operation in clause 5.8.9.1.2 on the corresponding PC5-RRC connection in following cases:
- the release of sidelink DRBs associated with the peer UE, as specified in clause 5.8.9.1a.1;
- the establishment of sidelink DRBs associated with the peer UE, as specified in clause 5.8.9.1a.2;
- the modification for the parameters included in SLRB-Config of sidelink DRBs associated with the peer UE, as specified in clause 5.8.9.1a.2;
- the release of PC5 Relay RLC channels for L2 U2N Relay UE and Remote UE, as specified in clause 5.8.9.7.1;
- the establishment of PC5 Relay RLC channels for L2 U2N Relay UE and Remote UE, as specified in clause 5.8.9.7.2;
- the modification for the parameters included in SL-RLC-ChannelConfig-PC5 of PC5 Relay RLC channels for L2 U2N Relay UE and Remote UE, as specified in clause 5.8.9.7.2;
- the (re-)configuration of the peer UE to perform NR sidelink measurement and report.
- the (re-)configuration of the sidelink CSI reference signal resources and CSI reporting latency bound;
- the (re-)configuration of the peer UE to perform sidelink DRX.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

[ . . . ]

3GPP TS 23.304 describes support of UE-to-Network (U2N) Relay in Release 17, which means a relay UE will be used to support communication between a remote UE and the network in case the remote UE cannot access the network directly. There are two different types of solutions for U2N Relay, including a Layer-2 (based) U2N Relay and a Layer-3 (based) U2N Relay.

Both Model A discovery and Model B discovery are supported for the remote UE to discover a U2N Relay. Model A uses a single discovery protocol message (i.e. Discovery Announcement) and Model B uses two discovery protocol messages (i.e. Discovery Solicitation and Discovery Response). In case there are multiple relay UEs in proximity of the remote UE, one of the relay UEs will be selected based on e.g. measurement results on the discovery messages transmitted by different relay UEs. After selecting a suitable relay UE, the remote UE will then establish a PC5 unicast link with the relay UE to support U2N Relay operation.

To access a concerned service from a data network (DN), a PDU session should be established with the DN and the PDU Session Establishment Request message includes an S-NSSAI and a DNN associated with the PDU session. In the Layer-2 U2N Relay solution, the remote UE establishes a PDU session with the network via the relay UE, while the relay UE establishes the PDU session with the network for the remote UE in the Layer-3 U2N Relay solution.

For a 5G ProSe Layer-3 U2N Remote UE accessing network via 5G ProSe Layer-3 U2N Relay (without N3IWF), the QoS requirement of the relay traffic between 5G ProSe Layer-3 Remote UE and UPF can be satisfied by the corresponding QoS control for the PC5 link between 5G ProSe Layer-3 U2N Remote UE and 5G ProSe Layer-3 U2N Relay (i.e. PC5 QoS control) and the QoS control for the PDU session established between 5G ProSe Layer-3 U2N Relay and UPF (i.e. Uu QoS control). The PC5 QoS is controlled with PC5 QoS rules and PC5 QoS parameters (e.g. PQI, GFBR, MFBR, PC5 LINK-AMBR) as specified in clause 5.4 of TS 23.287. The QoS for the PDU session established between the 5G ProSe Layer-3 U2N Relay and UPF (i.e. Uu QoS control) is controlled with QoS rules and 5G QoS parameters (e.g. 5QI, GFBR, MFBR) as specified in clause 5.7 of TS 23.501.

As shown in FIG. 5.6.2.1-1 of 3GPP TS 23.304 V17.3.0, which is reproduced as FIG. 8 of the present application, the end-to-end QoS can be met only when the QoS requirements are properly translated and satisfied over the two legs respectively. To achieve this, the QoS mapping can be pre-configured or provided to the 5G ProSe Layer-3 U2N Relay by the PCF using Prose Policy as specified in clause 5.1.4.1 of 3GPP TS 23.304 V17.3.0. The QoS mapping includes combinations of the 5QIs and PQIs mapping as entries. The PQI shall have standardized values as defined in Table 5.6.1-1 (reproduced as FIG. 7) of TS 23.304 and in Table 5.4.4-1 (not shown) of TS 23.287. The 5QI shall have standardized values as defined in clause 5.7.5 of TS 23.501. Separate QoS mappings can be configured for different RSCs (or connectivity services).

If the 5G ProSe Layer-3 Remote UE initiates PC5 QoS flow setup or modification during the Layer-2 link establishment or modification procedure, the 5G ProSe Layer-3 U2N Remote UE provides the QoS Info as described in clause 6.4.3.6 of TS 23.304 to the 5G ProSe Layer-3 U2N Relay. The received PC5 QoS parameters of the QoS Info (i.e. PQI and conditionally other parameters such as MFBR/GFBR, etc.) are interpreted as the end-to-end QoS requirements by the 5G ProSe Layer-3 U2N Relay for the traffic transmission between 5G ProSe Layer-3 Remote UE and UPF.

If the end-to-end QoS requirements can be supported by an entry in QoS mapping, the 5G ProSe Layer-3 U2N Relay uses the 5QI of the entry for the Uu QoS control, and uses the PQI of the entry for the PC5 QoS control. If the end-to-end QoS requirements cannot be supported by any entries in QoS mapping, the 5G ProSe Layer-3 U2N Relay, based on its implementation, decides the 5QI for the Uu QoS control and PQI for the PC5 QoS control. The 5G ProSe Layer-3 U2N Relay provides the QoS Info (including PQI value chosen by the 5G ProSe Layer-3 U2N Relay) as part of the Accept message to the 5G ProSe Layer-3 U2N Remote UE. If the 5G ProSe Layer-3 Remote UE performs the Layer-2 link modification procedure to add new PC5 QoS Flow(s) or modify the existing PC5 QoS Flow(s) for IP traffic or Ethernet traffic over PC5 reference point, the 5G ProSe Layer-3 U2N Remote UE may also provide the PC5 QoS Rule(s) for the PC5 QoS Flow(s) to be added or modified to the 5G ProSe Layer-3 U2N Relay. The 5G ProSe Layer-3 U2N Relay may generate the Packet Filters used over Uu reference point based on the received PC5 QoS Rule(s).

The 5G ProSe Layer-3 U2N Relay performs the UE requested PDU session Modification as defined in TS 23.502 for authorizing the requested QoS including the 5QI and the Packet Filters. If the PCF authorizes the requested QoS with a different 5QI value, the 5G ProSe Layer-3 U2N Relay may further update the PQI value based on the authorized 5QI value, and the 5G ProSe Layer-3 U2N Relay performs the Layer-2 link modification procedure as defined in clause 6.4.3.6 to update the corresponding PC5 QoS Flow with the updated PQI value.

To support traffic transmission between 5G ProSe Layer-3 U2N Relay and 5G ProSe Layer-3 U2N Remote UE, the 5G ProSe Layer-3 U2N Relay needs to transmit a Sidelink UE Information message to the gNB to request assignment of transmission resource for the newly added PC5 QoS flow(s). This is done by a lower layer (e.g. RRC layer) in the 5G ProSe Layer-3 U2N Relay when receiving the new PC5 QoS flow(s) and the associated PC5 QoS parameters (e.g. PQI) from the upper layer(s). The gNB may reply with a RRC Reconfiguration message to assign the transmission resource (including a sidelink DRB configuration) for the PC5 QoS flow(s). The 5G ProSe Layer-3 U2N Relay then provides the sidelink DRB configuration to the 5G ProSe Layer-3 U2N Remote UE via a sidelink RRC reconfiguration procedure.

Figure 18:
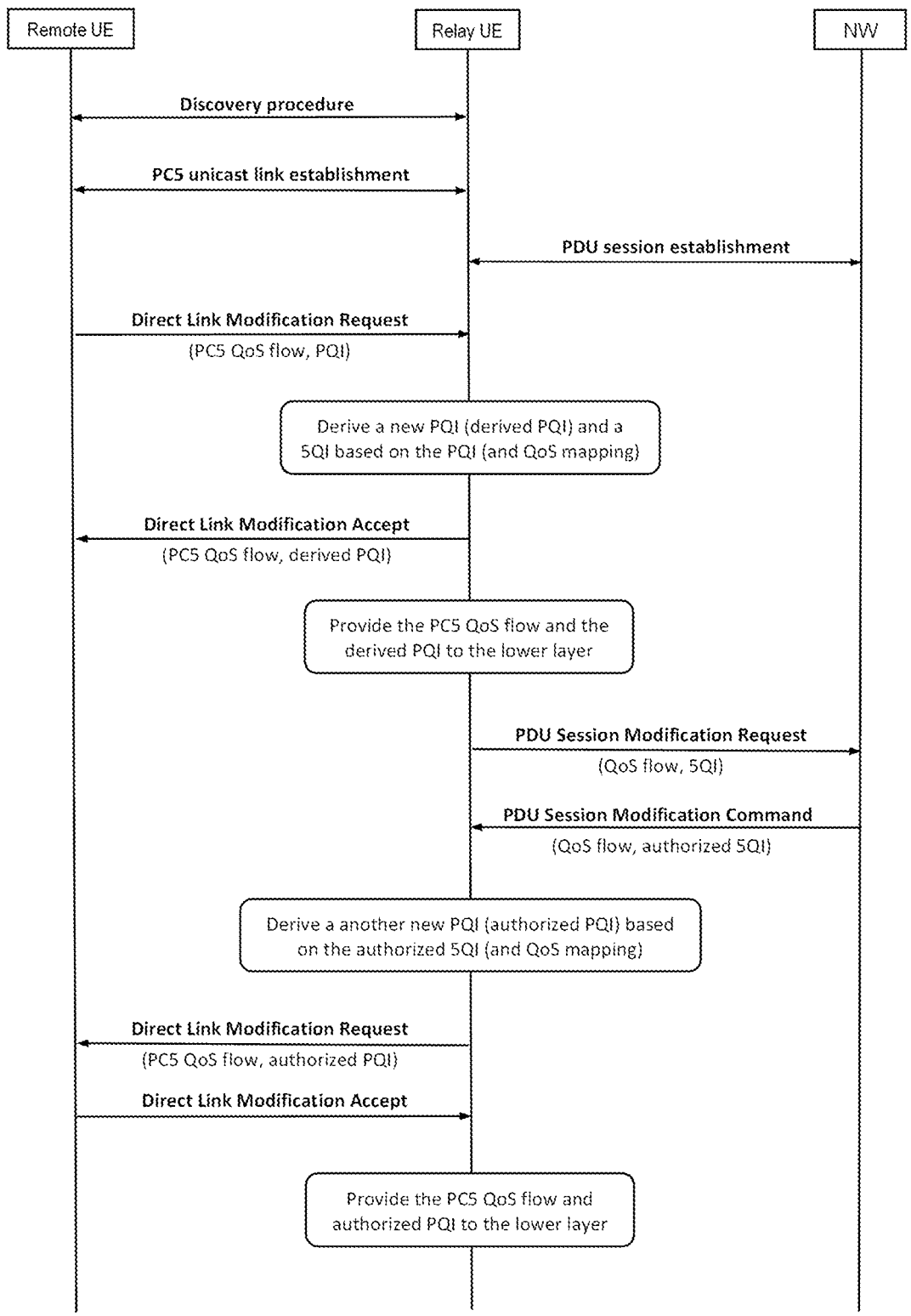
FIG. 18 is a message flow diagram illustrating a Layer-3 U2N Remote UE initiated PC5 QoS flow setup according to one exemplary embodiment.
Figure 19:
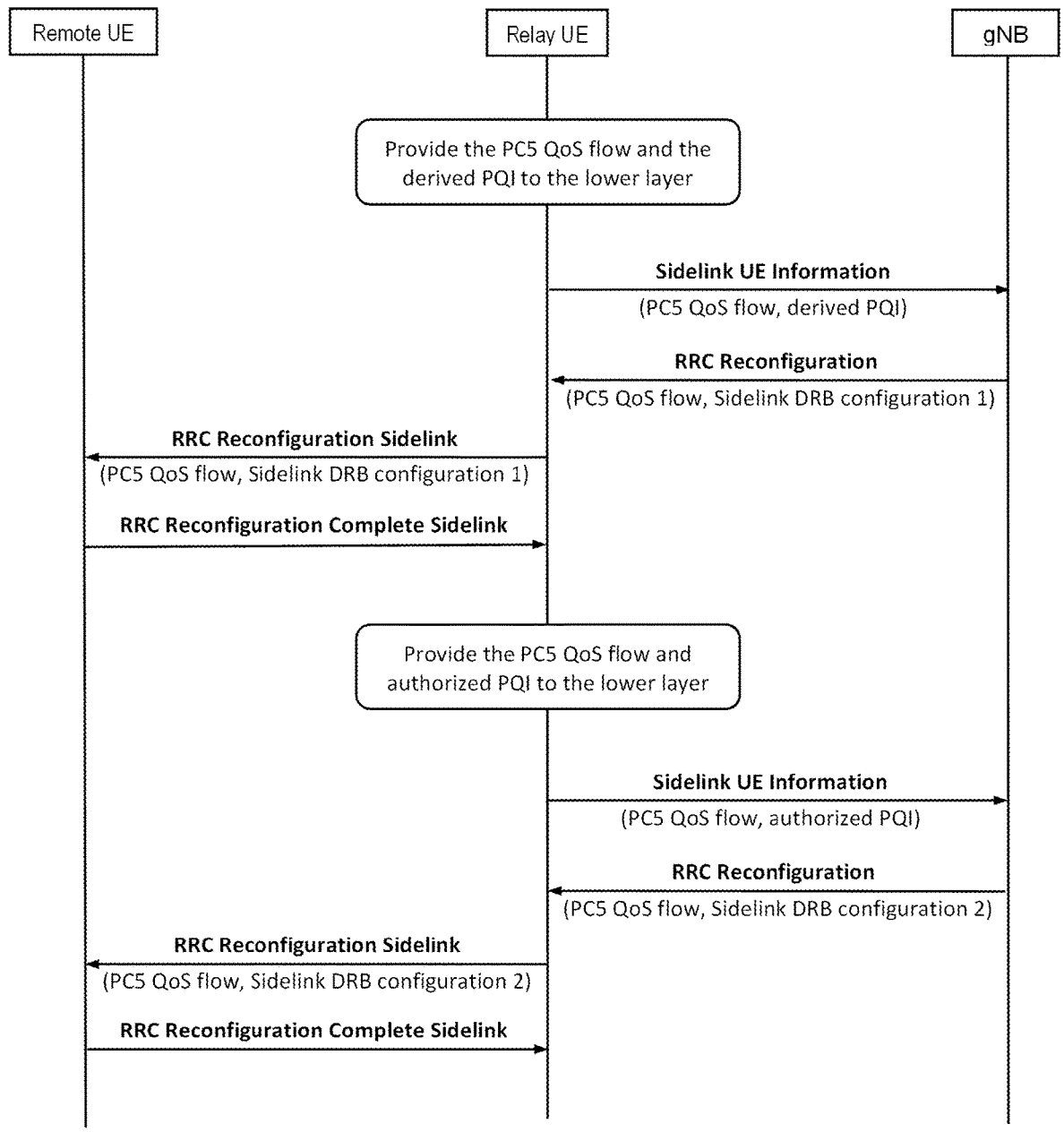
FIG. 19 is a message flow diagram illustrating sidelink configurations in lower layer(s) during Layer-3 U2N Remote UE initiated PC5 QoS flow setup according to one exemplary embodiment.

FIG. 18 illustrates the Layer-3 U2N Remote UE initiated PC5 QoS flow setup procedure described above. FIG. 19 shows the sidelink configurations in the lower layer during the Layer-3 U2N Remote UE initiated PC5 QoS flow setup according to TS 38.331. As shown in FIG. 18, when receiving a Direct Link Modification Request message including a new PC5 QoS flow and its PQI from the Layer-3 U2N Remote UE, the Layer-3 U2N Relay may reply a Direct Link Modification Accept message carrying the PQI derived by the Layer-3 U2N Relay. Besides, the Layer-3 U2N Relay would provide the new PC5 QoS flow and the derived PQI to the lower layer. Furthermore, the Layer-3 U2N Relay also initiate a PDU session modification procedure for the new PC5 QoS flow indicating the 5QI derived by the Layer-3 U2N Relay. After receiving the authorized 5QI of the new PC5 QoS flow in a PDU Session Modification Command from the network (NW), the Layer-3 U2N Relay will initiate a new direct link modification procedure toward the Layer-3 U2N Remote UE to inform of a new PQI derived by the Layer-3 U2N Relay according to the authorized 5QI if the 5G ProSe layer-3 UE-to-network Relay receives the authorized QoS flow descriptions with a 5QI value which is different from the 5QI value indicated by the 5G ProSe layer-3 UE-to-network Relay in the PDU Session Modification Request message. In addition, the Layer-3 U2N Relay would also provide the authorized PQI of the new PC5 QoS flow to the lower layer for update. As a result, there will be two direct link modification procedures performed during the Layer-3 U2N Remote UE initiated PC5 QoS flow setup procedure. In addition, the sidelink configurations are also repeated twice as shown in FIG. 19.

Figure 20:
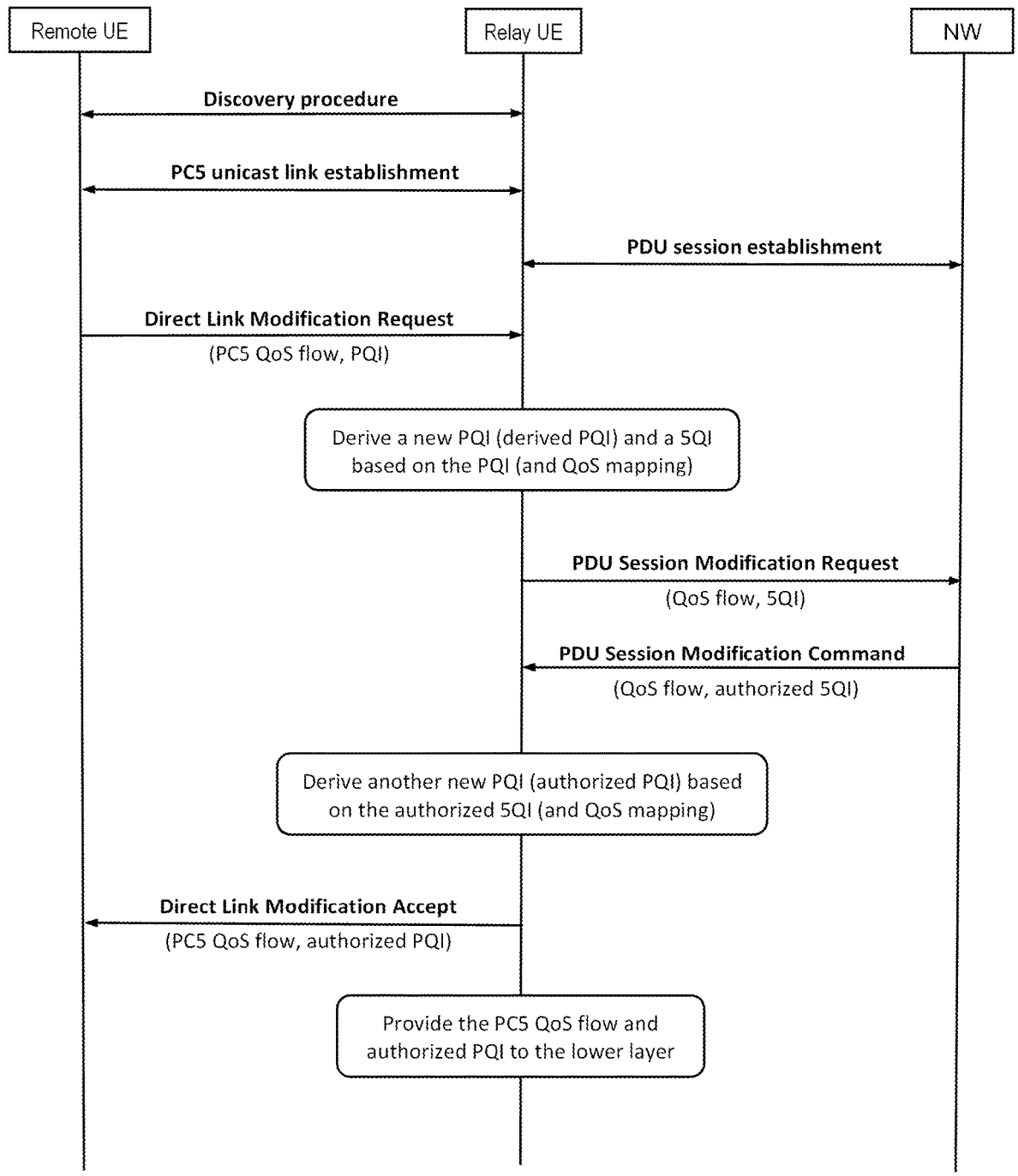
FIG. 20 is a message flow diagram illustrating a simplified Layer-3 U2N Remote UE initiated PC5 QoS flow setup according to one exemplary embodiment.

It is beneficial in terms of signalling overhead reduction and simplicity for the Layer-3 U2N Relay to reply the Direct Link Modification Accept message to the Layer-3 U2N Remote UE after receiving the PDU Session Modification Command message from the network. By this way, the Layer-3 U2N Relay does not need to initiate the second direct link modification procedure. Besides, the Layer-3 U2N Relay only needs to provide the authorized PQI of the new PC5 QoS flow to the lower layer as shown in FIG. 20 (which illustrates a simplified Layer-3 U2N Remote UE initiated PC5 QoS flow setup) and thus the sidelink configuration in FIG. 19 is performed only once. In this situation, the first PQI derived according to the PQI received from the Layer-3 U2N Remote UE is not provided to the lower layer before transmission of the PDU Session Modification Request message or before reception of the PDU Session Modification Command message.

An example of text proposal for 3GPP TS 24.554 to realize the above idea is listed below:

8.2.6.3.3 PC5 QoS Flows Handling Initiated by the 5G ProSe Layer-3 Remote UE

For PC5 QoS flows setup or modification initiated by the 5G ProSe layer-3 remote UE, the 5G ProSe layer-3 remote UE shall provide the PC5 QoS flow context as defined in clause 7.2.7 to the 5G ProSe layer-3 UE-to-network relay UE to indicate the end-to-end QoS requirements for the traffic transmission between 5G ProSe layer-3 remote UE and the network.

In addition, if the 5G ProSe layer-3 remote UE wants to add new PC5 QoS flow(s) or modify the existing PC5 QoS flow(s) for IP traffic or Ethernet traffic, the 5G ProSe layer-3 remote UE may also provide the PC5 QoS rule(s) for the PC5 QoS flow(s) to be added or modified to the 5G ProSe layer-3 UE-to-network relay UE.

Upon reception of the PC5 QoS context from the 5G ProSe layer-3 remote UE, the 5G ProSe layer-3 UE-to-network relay UE:

a) shall perform one of the following:
 1) if the end-to-end QoS requirements can be supported by an entry in QoS mapping configured in clause 5.2.5, then the 5G ProSe layer-3 UE-to-network relay UE uses the 5QI of the entry for the Uu QoS control and uses the PQI of the entry for the PC5 QoS control; or
 2) if the end-to-end QoS requirements cannot be supported by any entry in QoS mapping configured in clause 5.2.5, then the 5G ProSe layer-3 UE-to-network relay UE determines the 5QI for the Uu QoS control and PQI for the PC5 QoS control based on its implementation;

b) optionally, derives the packet filter(s) used over Uu reference point if the 5G ProSe layer-3 UE-to-network relay UE received PC5 QoS rule(s) from 5G ProSe layer-3 remote UE;

c) if a new QoS flow needs to be established or the existing QoS flow(s) needs to be modified, shall perform UE-requested PDU session modification procedure as specified in clause 6.4.2 in 3GPP TS 24.501 [11] providing:
 1) the Requested QoS flow descriptions IE with the 5QI value determined in bullet a); or
 2) the Requested QoS rules IE with the packet filter(s) if packet filter(s) are derived in bullet b);

d) shall further update the corresponding PC5 QoS flow with the updated PQI value if the 5G ProSe layer-3 UE-to-network relay UE receives the authorized QoS flow descriptions with a 5QI value which is different from the 5QI value indicated by the 5G ProSe layer-3 UE-to-network relay UE as described in bullet c4); and e) shall provide the 5G ProSe layer-3 remote UE with the PQI authorized by the network, the corresponding PC5 QoS parameters and the corresponding ProSe identifier(s).

Figure 21A:
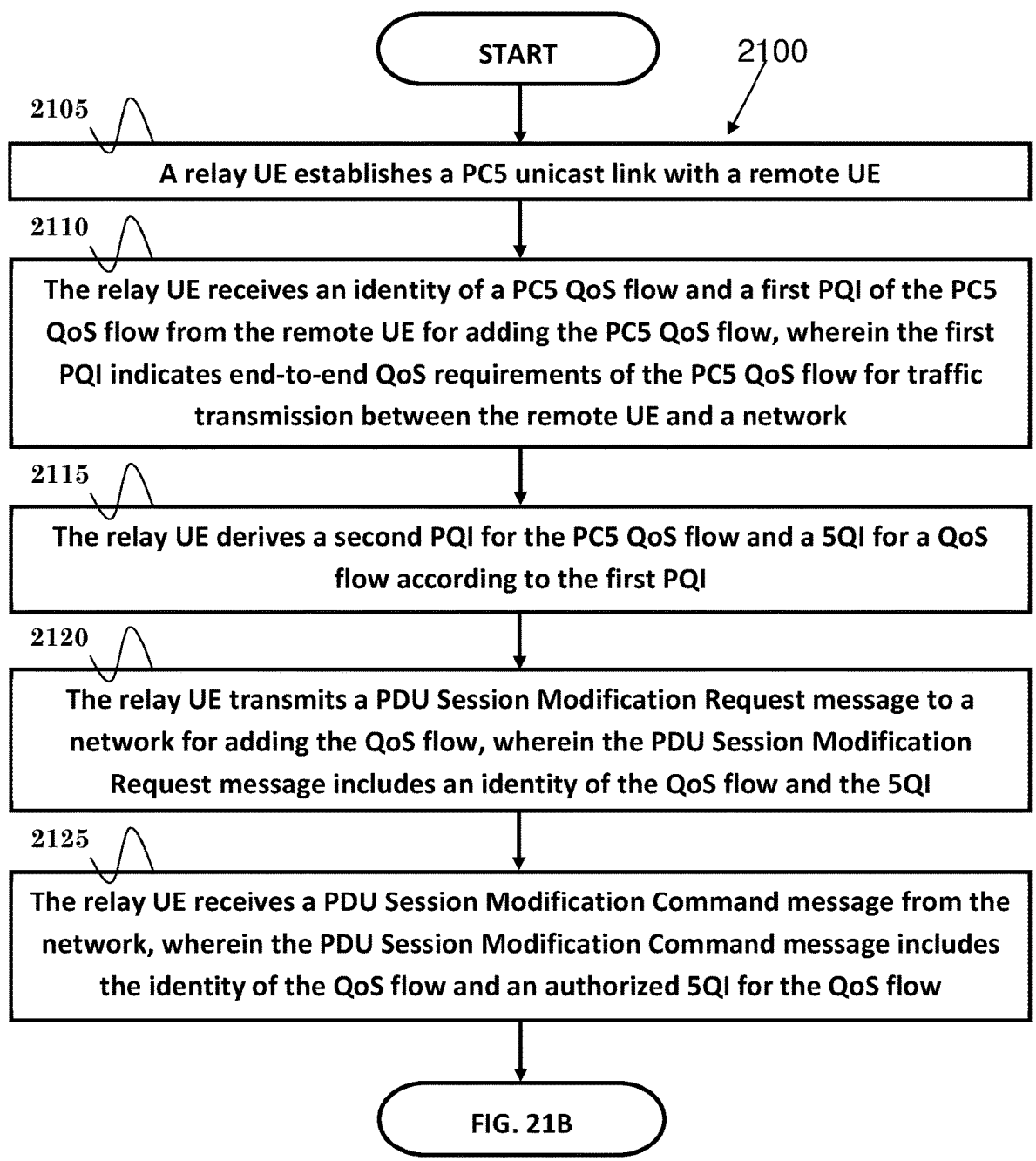
FIGS. 21A and 21B are a flow chart according to one exemplary embodiment.
Figure 21B:
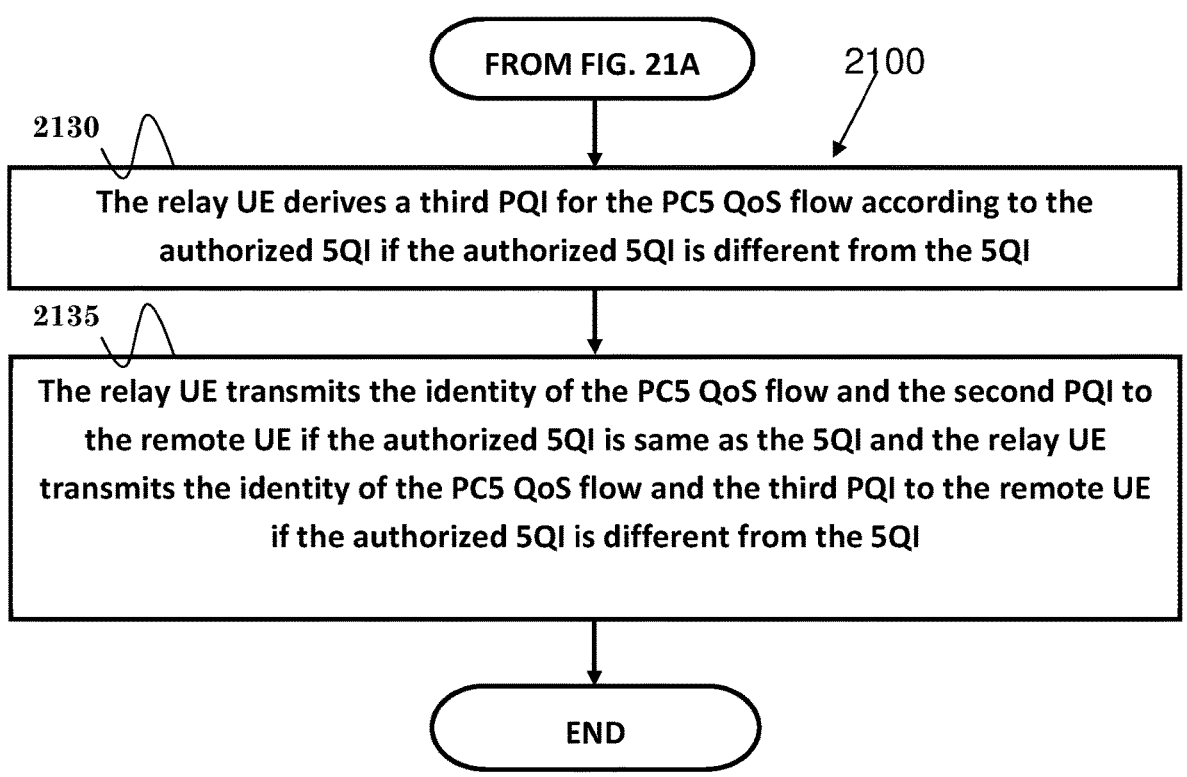

FIGS. 21A and 21B is collectively a flow chart 2100 from the perspective of a relay UE. In step 2115, a relay UE establishes a PC5 unicast link with a remote UE. In step 2110, the relay UE receives an identity of a PC5 QoS flow and a first PQI of the PC5 QoS flow from the remote UE for adding the PC5 QoS flow, wherein the first PQI indicates end-to-end QoS requirements of the PC5 QoS flow for traffic transmission between the remote UE and a network. In step 2115, the relay UE derives a second PQI for the PC5 QoS flow and a 5QI for a QoS flow according to the first PQI. In step 2120, the relay UE transmits a Protocol Data Unit (PDU) Session Modification Request message to the network for adding the QoS flow, wherein the PDU Session Modification Request message includes an identity of the QoS flow and the 5QI. In step 2125, the relay UE receives a PDU Session Modification Command message from the network, wherein the PDU Session Modification Command message includes the identity of the QoS flow and an authorized 5QI for the QoS flow. In step 2130, the relay UE derives a third PQI for the PC5 QoS flow according to the authorized 5QI if the authorized 5QI is different from the 5QL. In step 2135, the relay UE transmits the identity of the PC5 QoS flow and the second PQI to the remote UE if the authorized 5QI is same as the 5QI and the relay UE transmits the identity of the PC5 QoS flow and the third PQI to the remote UE if the authorized 5QI is different from the 5QI.

In one embodiment, the relay UE may not transmit the second PQI to the remote UE before reception of the PDU Session Modification Command message from the network. The second PQI and the 5QI could be derived according to the first PQI and QoS mapping. The QoS mapping could be pre-configured or provided to the relay UE by the network. The third PQI could be derived according to the authorized 5QI and QoS mapping.

In one embodiment, the identity of the PC5 QoS flow and the first PQI of the PC5 QoS flow could be received in a Direct Link Modification Request message. The identity of the PC5 QoS flow and the second PQI or the third PQI could be transmitted in a Direct Link Modification Accept message. The QoS flow may correspond to the PC5 QoS flow.

In one embodiment, a PDU session could be established by the relay UE for the remote UE to access a service from the network via the relay UE. The relay UE could be a Layer-3 UE-to-Network Relay UE.

Referring back to FIGS. 3 and 4, in one exemplary embodiment of a method for a relay UE, the relay UE 300 includes a program code 312 stored in the memory 310. The CPU 308 could execute program code 312 to enable the relay UE (i) to establish a PC5 unicast link with a remote UE, (ii) to receive an identity of a PC5 QoS flow and a first PC5 5G QoS Identifier (PQI) of the PC5 QoS flow from the remote UE for adding the PC5 QoS flow, wherein the first PQI indicates end-to-end QoS requirements of the PC5 QoS flow for traffic transmission between the remote UE and a network, (iii) to derive a second PQI for the PC5 QoS flow and a 5QI for a QoS flow according to the first PQI, (iv) to transmit a Protocol Data Unit (PDU) Session Modification Request message to the network for adding the QoS flow, wherein the PDU Session Modification Request message includes an identity of the QoS flow and the 5QI, (v) to receive a PDU Session Modification Command message from the network, wherein the PDU Session Modification Command message includes the identity of the QoS flow and an authorized 5QI for the QoS flow, (vi) to derive a third PQI for the PC5 QoS flow according to the authorized 5QI if the authorized 5QI is different from the 5QI, and (vii) to transmit the identity of the PC5 QoS flow and the second PQI to the remote UE if the authorized 5QI is same as the 5QI and the relay UE transmits the identity of the PC5 QoS flow and the third PQI to the remote UE if the authorized 5QI is different from the 5QI. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for Quality of Service (QoS) flow establishment, comprising:
   a relay User Equipment (UE) establishes a PC5 unicast link with a remote UE;
   the relay UE receives an identifier of a PC5 QoS flow and a first PC5 5G QoS Identifier (PQI) of the PC5 QoS flow from the remote UE for adding the PC5 QoS flow, wherein the first PQI indicates end-to-end QoS requirements of the PC5 QoS flow for traffic transmission between the remote UE and a network;
   the relay UE derives a second PQI for the PC5 QoS flow and a 5G QoS Identifier (5QI) for a QoS flow according to the first PQI;
   the relay UE transmits a Protocol Data Unit (PDU) Session Modification Request message to the network for adding the QoS flow, wherein the PDU Session Modification Request message includes an identifier of the QoS flow and the 5QI;
   the relay UE receives a PDU Session Modification Command message from the network, wherein the PDU Session Modification Command message includes the identifier of the QoS flow and an authorized 5QI for the QoS flow;
   the relay UE derives a third PQI for the PC5 QoS flow according to the authorized 5QI if the authorized 5QI is different from the 5QI; and
   the relay UE transmits the identifier of the PC5 QoS flow and the second PQI to the remote UE if the authorized 5QI is same as the 5QI and the relay UE transmits the identifier of the PC5 QoS flow and the third PQI to the remote UE if the authorized 5QI is different from the 5QI.

2. The method of claim 1, wherein the relay UE does not transmit the second PQI to the remote UE before reception of the PDU Session Modification Command message from the network.

3. The method of claim 1, wherein the second PQI and the 5QI are derived according to the first PQI and QoS mapping.

4. The method of claim 3, wherein the QoS mapping is pre-configured or provided to the relay UE by the network.

5. The method of claim 1, wherein the third PQI is derived according to the authorized 5QI and QoS mapping.

6. The method of claim 1, wherein the identifier of the PC5 QoS flow and the first PQI of the PC5 QoS flow are received in a Direct Link Modification Request message.

7. The method of claim 1, wherein the identifier of the PC5 QoS flow and the second PQI or the third PQI are transmitted in a Direct Link Modification Accept message.

8. The method of claim 1, wherein the QoS flow corresponds to the PC5 QoS flow.

9. The method of claim 1, wherein a Protocol Data Unit (PDU) session is established by the relay UE for the remote UE to access a service from the network via the relay UE.

10. The method of claim 1, wherein the relay UE is a Layer-3 UE-to-Network Relay UE.

11. A relay UE (User Equipment), comprising:
    a control circuit;
    a processor installed in the control circuit; and
    a memory installed in the control circuit and operatively coupled to the processor;
    wherein the processor is configured to execute a program code stored in the memory to:
      establish a PC5 unicast link with a remote UE;
      receive an identifier of a PC5 QoS flow and a first PC5 5G QoS Identifier (PQI) of the PC5 QoS flow from the remote UE for adding the PC5 QoS flow, wherein the first PQI indicates end-to-end QoS requirements of the PC5 QoS flow for traffic transmission between the remote UE and a network;
      derive a second PQI for the PC5 QoS flow and a 5G QoS Identifier (5QI) for a QoS flow according to the first PQI;
      transmit a Protocol Data Unit (PDU) Session Modification Request message to the network for adding the QoS flow, wherein the PDU Session Modification Request message includes an identifier of the QoS flow and the 5QI;
      receive a PDU Session Modification Command message from the network, wherein the PDU Session Modification Command message includes the identifier of the QoS flow and an authorized 5QI for the QoS flow;
      derive a third PQI for the PC5 QoS flow according to the authorized 5QI if the authorized 5QI is different from the 5QI; and
      transmit the identifier of the PC5 QoS flow and the second PQI to the remote UE if the authorized 5QI is same as the 5QI and the relay UE transmits the identifier of the PC5 QoS flow and the third PQI to the remote UE if the authorized 5QI is different from the 5QI.

12. The relay UE of claim 11, wherein the relay UE does not transmit the second PQI to the remote UE before reception of the PDU Session Modification Command message from the network.

13. The relay UE of claim 11, wherein the second PQI and the 5QI are derived according to the first PQI and QoS mapping.

14. The relay UE of claim 13, wherein the QoS mapping is pre-configured or provided to the relay UE by the network.

15. The relay UE of claim 11, wherein the third PQI is derived according to the authorized 5QI and QoS mapping.

16. The relay UE of claim 11, wherein the identifier of the PC5 QoS flow and the first PQI of the PC5 QoS flow are received in a Direct Link Modification Request message.

17. The relay UE of claim 11, wherein the identifier of the PC5 QoS flow and the second PQI or the third PQI are transmitted in a Direct Link Modification Accept message.

18. The relay UE of claim 11, wherein the QoS flow corresponds to the PC5 QoS flow.

19. The relay UE of claim 11, wherein a Protocol Data Unit (PDU) session is established by the relay UE for the remote UE to access a service from the network via the relay UE.

20. The UE of claim 11, wherein the relay UE is a Layer-3 UE-to-Network Relay UE.

* * * * *